United States Patent
Kuusela et al.

(10) Patent No.: US 11,425,404 B2
(45) Date of Patent: Aug. 23, 2022

(54) VIDEO FRAME CODEC ARCHITECTURES

(71) Applicant: Google LLC, Mountain View, CA (US)

(72) Inventors: Aki Oskari Kuusela, Palo Alto, CA (US); Ville-Mikko Rautio, Cupertino, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/870,531

(22) Filed: May 8, 2020

(65) Prior Publication Data
US 2020/0275113 A1 Aug. 27, 2020

Related U.S. Application Data

(62) Division of application No. 15/844,334, filed on Dec. 15, 2017, now Pat. No. 10,659,797.
(Continued)

(51) Int. Cl.
*H04N 19/40* (2014.01)
*H04N 19/172* (2014.01)
(Continued)

(52) U.S. Cl.
CPC ........... *H04N 19/44* (2014.11); *H04N 19/172* (2014.11); *H04N 19/20* (2014.11); *H04N 19/42* (2014.11); *H04N 19/40* (2014.11)

(58) Field of Classification Search
CPC .............................. H04N 19/44; H04N 19/20
See application file for complete search history.

(56) References Cited

U.S. PATENT DOCUMENTS 6,058,459 A 5/2000 Owen et al.
6,157,740 A 12/2000 Buerkle et al.
(Continued)

FOREIGN PATENT DOCUMENTS

CN 102547283 7/2012
CN 105992005 10/2016
(Continued)

OTHER PUBLICATIONS

Nicholas H. Mastronarde, "A Queuing-Theoretic Approach to Task Scheduling and Processor Selection for Video-Decoding Applications" Student Member, IEEE, and Mihaela van der Schaar, Senior Member, IEEE Nov. 1, 2007.*
"Foreign Office Action", KR Application No. 1020197032379, dated Jan. 21, 2021, 19 pages.
(Continued)

*Primary Examiner* — Tsion B Owens
(74) *Attorney, Agent, or Firm* — Colby Nipper PLLC

(57) ABSTRACT

Techniques and apparatuses are described for video frame codec architectures. A frame decompressor decompresses compressed frames to produce decompressed frames. A frame decompressor controller arbitrates shared access to the frame decompressor. Multiple cores of an SoC request to receive a decompressed frame from the frame decompressor via the frame decompressor controller. The frame decompressor controller can implement a request queue and can order the servicing of requests based on priority of the requests or requesting cores. The frame decompressor controller can also establish a time-sharing protocol for access by the multiple cores. In some implementations, a video decoder is logically integrated with the frame decompressor and stores portions of a decompressed frame in a video buffer, and a display controller retrieves the portions for display using a synchronization mechanism. In analogous manners, a frame compressor controller can arbitrate shared access to a frame compressor for the multiple cores.

20 Claims, 12 Drawing Sheets

Related U.S. Application Data

(60) Provisional application No. 62/579,820, filed on Oct. 31, 2017.

(51) Int. Cl.
  *H04N 19/44* (2014.01)
  *H04N 19/20* (2014.01)
  *H04N 19/42* (2014.01)

(56) References Cited

U.S. PATENT DOCUMENTS

| | | | |
|---|---|---|---|
| 6,717,989 | B1 | 4/2004 | Simsic et al. |
| 9,277,218 | B2 | 3/2016 | Guo et al. |
| 9,313,493 | B1 | 4/2016 | Maaninen |
| 9,712,830 | B1 | 7/2017 | Horn et al. |
| 10,659,797 | B2 | 5/2020 | Kuusela et al. |
| 2001/0007576 | A1 | 7/2001 | Lyu |
| 2005/0063459 | A1* | 3/2005 | Karaoguz ............... H04N 5/46 375/240.01 |
| 2007/0117015 | A1 | 5/2007 | Yamamoto et al. |
| 2007/0177015 | A1 | 8/2007 | Arakawa et al. |
| 2008/0126812 | A1* | 5/2008 | Ahmed ............... H04N 19/42 713/189 |
| 2012/0093234 | A1 | 4/2012 | Rosenzweig et al. |
| 2015/0092834 | A1* | 4/2015 | Cote ............... H04N 19/13 375/240.02 |
| 2019/0132604 | A1 | 5/2019 | Kuusela et al. |
| 2022/0166994 | A1 | 5/2022 | Kuusela et al. |

FOREIGN PATENT DOCUMENTS

| | | |
|---|---|---|
| JP | 2007266970 | 10/2007 |
| JP | 2009302704 | 12/2009 |
| TW | 201725907 | 7/2017 |
| TW | 201725908 | 7/2017 |
| WO | 2006121472 | 11/2006 |
| WO | 2019089101 | 5/2019 |

OTHER PUBLICATIONS

"Arm Frame Buffer Compression", retrieved from https://developer.arm.com/technologies/graphics-technologies/arm-frame-buffer-compression on Sep. 14, 2017, 5 pages.
"First Action Interview Office Action", U.S. Appl. No. 15/844,334, dated May 10, 2019, 3 pages.
"Foreign Office Action", TW Application No. 107119412, dated Apr. 25, 2019, 9 pages.
"International Search Report and Written Opinion", PCT Application No. PCT/US2018/042164, dated Oct. 22, 2018, 22 pages.
"Non-Final Office Action", U.S. Appl. No. 15/844,334, filed Aug. 12, 2019, 9 Pages.
"Notice of Allowance", U.S. Appl. No. 15/844,334, filed Jan. 14, 2020, 7 Pages.
"Pre-Interview Communication", U.S. Appl. No. 15/844,334, May 28, 2019, 4 pages.
Kim, et al., "Multithread Video Coding Processor for the Videophone", IEEE Signal Processing Society Workshop on Sakai, Japan, XP010193944; DOI: 10.1109/VLSISP.1995.527518, Sep. 16-18, 1995, 11 pages.
Kim, et al., "Single Encoder and Decoder Design for Multi-View Video", SPIE, Applications of Digital Image Processing vol. 6312, XP040228836, DOI: 10.1117/12.678960, Aug. 24, 2006, 9 pages.
Mastronarde, et al., "A Queuing-Theoretic Approach to Task Scheduling and Processor Selection for Video-Decoding Applications", IEEE Transactions on Multimedia, vol. 9, No. 7, Nov. 2007, Nov. 2007, 15 pages.
"Search Report", Taiwanese Application No. 109107219, dated Oct. 26, 2020, 1 page.
"International Preliminary Report on Patentability", PCT Application No. PCT/US2018/042164, dated May 14, 2020, 15 pages.
"Foreign Office Action", JP Application No. 2019-559770, dated Mar. 9, 2021, 13 pages.
"Foreign Office Action", CN Application No. 201880028788.3, dated Apr. 15, 2021, 31 pages.
"Foreign Office Action", EP Application No. 18755951.3, dated May 27, 2021, 5 pages.
"Foreign Office Action", IN Application No. 201947043036, dated Jun. 18, 2021, 8 pages.
"Foreign Office Action", KR Application No. 10-2019-7032379, dated Aug. 12, 2021, 8 pages.
"Foreign Office Action", JP Application No. 2019-559770, dated Oct. 19, 2021, 11 pages.
"Foreign Office Action", KR Application No. 10-2019-7032379, dated Oct. 27, 2021, 6 pages.
"Foreign Office Action", KR Application No. 10-2021-7032361, dated Nov. 22, 2021, 23 pages.
"Foreign Office Action", CN Application No. 201880028788.3, dated Jan. 30, 2022, 30 pages.

* cited by examiner

VIDEO FRAME CODEC ARCHITECTURES

RELATED APPLICATION

This application is a divisional of and claims priority to U.S. patent application Ser. No. 15/844,334, filed 15 Dec. 2017, entitled "Video Frame Codec Architectures," which in turn claims priority to U.S. Provisional Patent Application No. 62/579,820, filed 31 Oct. 2017, entitled "Video Frame Codec Architectures," the disclosures of which are incorporated by reference herein in their entirety.

BACKGROUND

Electronic devices play integral roles in manufacturing, communication, healthcare, commerce, social interaction, and entertainment. For example, electronic devices power the server farms that provide cloud-based, distributed computing functionality for commerce and communication. Devices with computing power are also embedded in many different types of modern equipment, from medical devices to appliances and from vehicles to industrial tools. Further, one electronic device—the smartphone—has become a necessity to literally always have at hand.

Many electronic devices, such as those with a camera or a display screen, manipulate video data. For example, a video may be obtained using a security camera and then enhanced to improve some visual aspect, such as the clarity or contrast. Existing video data can also be manipulated to improve the appearance of individual video frames for presentation on a display screen of a smartphone or television monitor. For example, the video data of a movie may be processed to improve the realism of artificial graphics or to upscale the display resolution. Video image data is also manipulated in industrial and medical environments. For instance, the image data from a three-dimensional body scan can be stitched together into a video presentation for review and analysis by a doctor.

In any of these situations, the manipulation of video data is a processing-intensive task. This is due in part to the size or amount of information typically present in video data. Consequently, the area of an integrated circuit (IC) chip that is devoted to handling video data can be greater than that for other types of data. The difficulty of handling video data has been exacerbated by the ever-increasing display resolution of videos that electronic devices are expected to handle. For example, high-definition (HD) video has approximately four times more video data than standard-definition (SD) video, and ultra-HD (UHD) or 4K video has approximately four times more video data than HD video.

The amount of video data that electronic devices are expected to process has therefore increased dramatically over the last decade or so. Video data processing demands are expected to further increase in the coming years as virtual reality (VR) and artificial reality (AR) usage becomes more common. Accordingly, electronic device manufacturers continue to strive to improve the ability of electronic devices to handle ever-increasing amounts of video data.

This background description is provided to generally present the context of the disclosure. Unless otherwise indicated herein, material described in this section is neither expressly nor impliedly admitted to be prior art to the present disclosure or the appended claims.

SUMMARY

Techniques and apparatuses are described for video frame codec architectures. These techniques and apparatuses enable integrated circuit (IC) chips to process high bandwidth video data using a lower amount of circuitry resources while also facilitating a streamlined workflow to upgrade to newer frame compression/decompression technologies, including lossless ones. To do so, the inclusion of multiple separate frame decompressing units at multiple different cores of an IC chip is obviated. Instead, a frame decompressor can provide a frame decompression service to multiple different cores that function as frame decompressor client circuits. A frame decompressor controller facilitates the sharing of the decompression service using a queueing or priority mechanism that orders decompression requests received from one or more cores of the multiple cores. The frame decompressor controller can also arbitrate access to the frame decompressor in accordance with a time-sharing protocol. In an example implementation, the frame decompressor is co-located with a video decoder client circuit, and the frame decompressor is shared at least with a display controller. Similarly, a frame compressor can provide a frame compression service to multiple different cores that function as frame compressor client circuits. A frame compressor controller facilitates the sharing of the compression service with the multiple cores. Further, a frame compression service and a frame decompression service can both be provided in a single IC chip to be shared across multiple cores.

Aspects described below include an electronic device comprising a frame decompressor and a frame decompressor controller. The frame decompressor is configured to decompress multiple compressed frames to produce multiple decompressed frames. The frame decompressor controller is coupled to the frame decompressor and configured to arbitrate access to the frame decompressor for multiple cores. The multiple cores include a first core and a second core. The first core is coupled to the frame decompressor controller and is configured to obtain via the frame decompressor controller a decompressed frame of the multiple decompressed frames produced by the frame decompressor. The second core is coupled to the frame decompressor controller and is configured to obtain via the frame decompressor controller another decompressed frame of the multiple decompressed frames produced by the frame decompressor.

Aspects described below also include a method for sharing frame decompression circuitry between multiple cores. The method comprises accepting, from a first core, a first request for a first decompressed frame. The method also comprises decompressing a first compressed frame to produce the first decompressed frame. The first decompressed frame is provided to the first core responsive to the first request. The method additionally comprises accepting, from a second core, a second request for a second decompressed frame. The method further comprises decompressing a second compressed frame to produce the second decompressed frame. The second decompressed frame is provided to the second core responsive to the second request.

Aspects described below include another electronic device comprising a video decoder and a display controller. The video decoder is configured to decode a video stream to produce multiple decoded frames. The video decoder includes a frame compressor, a frame decompressor, and a frame decompressor controller. The frame compressor is configured to compress the multiple decoded frames to produce multiple compressed frames. The frame decompressor is configured to decompress the multiple compressed frames to produce multiple decompressed frames. The frame decompressor controller is coupled to the frame decompressor and is configured to arbitrate access to the frame decompressor. The display controller is coupled to the frame decompressor controller. The display controller is configured to obtain, via the frame decompressor controller, a decompressed frame of the multiple decompressed frames produced by the frame decompressor.

Aspects described below also include a system comprising a frame decompressor and multiple cores. The frame decompressor is configured to decompress multiple compressed frames to produce multiple decompressed frames. The multiple cores include a first core and a second core. The first core is coupled to the frame decompressor and is configured to obtain a decompressed frame of the multiple decompressed frames. The second core is coupled to the frame decompressor and is configured to obtain another decompressed frame of the multiple decompressed frames. The system also comprises control means for controlling the frame decompressor to arbitrate access to the frame decompressor for the multiple cores, including for the first core and the second core. Additionally or alternatively, the system can comprise a frame compressor configured to compress multiple uncompressed frames to produce multiple compressed frames. The first and second cores can each obtain a respective compressed frame of the multiple compressed frames. Thus, the system can also comprise control means for controlling the frame compressor to arbitrate access to the frame compressor for the multiple cores, including for the first core and the second core.

BRIEF DESCRIPTION OF THE DRAWINGS

Apparatuses of and techniques for implementing video frame codec architectures are described with reference to the following drawings. The same numbers are used throughout the drawings to reference like features and components:

FIG. 3-1 illustrates an SoC having an example implementation of a video frame codec architecture that includes a frame compressor, a frame compressor controller, and multiple cores.

FIG. 3-2 illustrates an SoC having an example implementation of a video frame codec architecture that includes a frame decompressor, a frame decompressor controller, and multiple cores.

DETAILED DESCRIPTION

Overview

Figure 1:
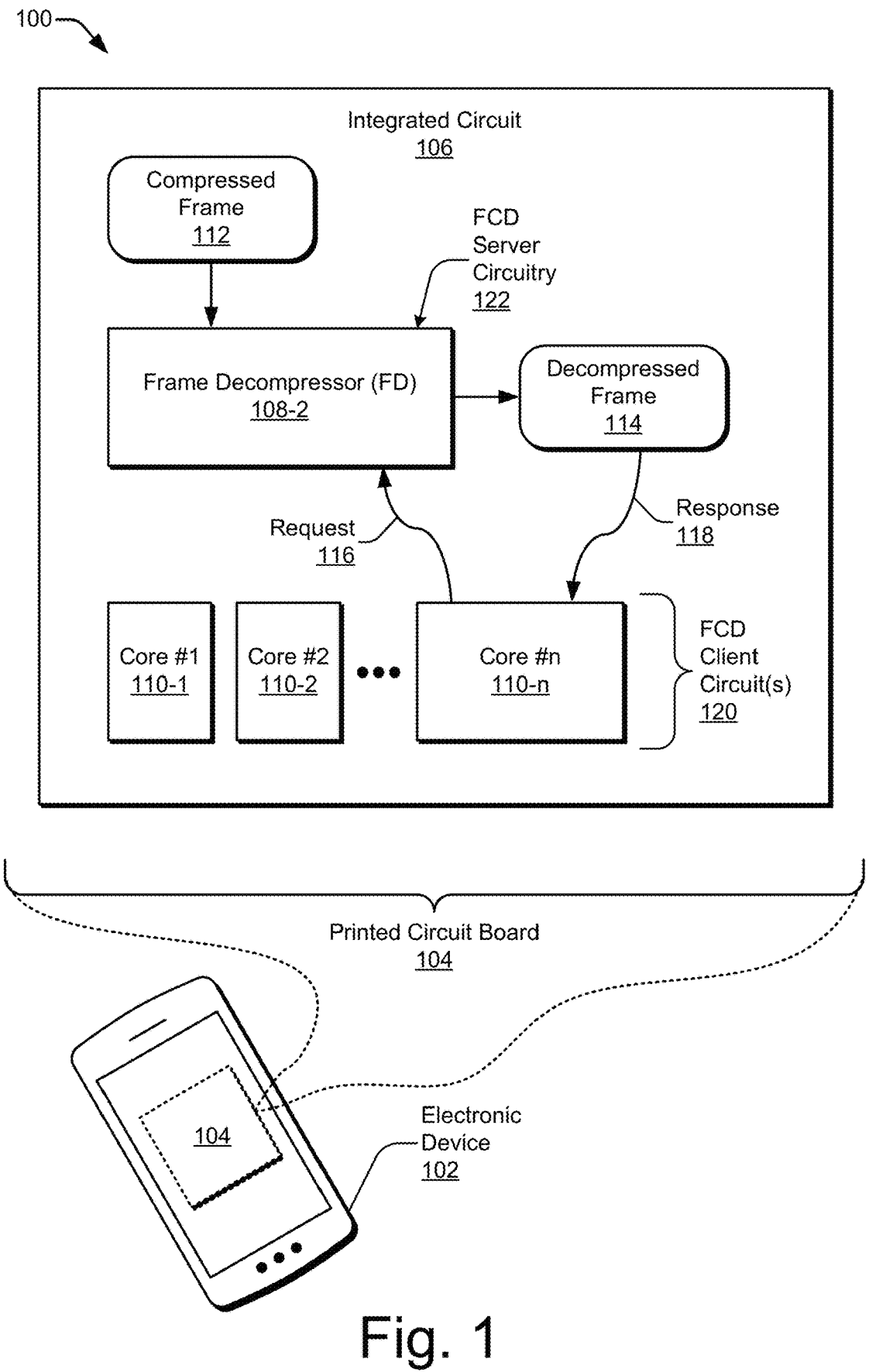
FIG. 1 illustrates an example environment including a printed circuit board in which video frame codec architectures can be implemented.

Data for a movie or other video consumes significant bandwidth in terms of both storage while at rest and transmission while propagating between electronic devices or the internal components thereof. As the display resolution for video has increased, the bandwidth demands have likewise increased. With ultra-HD (UHD) or 4K video, for example, there is approximately 15-20 times more video data to handle than with SD video, which was commonly used just a decade ago. This increased amount of data makes managing video difficult, even within a single integrated circuit (IC) chip. A typical system-on-chip (SoC), for instance, has a system bus that can become overloaded if raw decoded video data is transported between different SoC components using the system bus.

As is known, the bandwidth of a video can be reduced by encoding the video using some lossy codec, e.g. H.264. The encoded video can then be streamed, such as from a cloud server to a tablet computer, or saved, such as on a Blu-Ray disc or in flash memory. An end-user electronic device, for example, is then responsible for decoding the video for presentation on a display screen. Decoding entails transforming a stream of binary 1s and 0s, or bits, into individual decoded video frames, which can be displayed sequentially to represent the video. As part of this video encoding and decoding procedure, the video data is compressed and decompressed. With this video-level procedure (e.g., with an H.264 codec), the amount of compression is significant, but the compression is also lossy. Thus, because of the video-level compression/decompression procedure, some video information is lost to the point that image quality may be visibly changed.

This loss of video information is accepted to enable the large quantity of video data to be transmitted between devices or stored using a reasonable amount of memory. After decoding a video stream at the electronic device to produced decoded video frames, this large quantity of video data is recreated on a frame-by-frame basis as a group of frames or many individual frames. Each of these individual frames is still an appreciable amount of data. To handle this amount of video data at the electronic device, if a decoded video frame is not currently being processed or displayed, the decoded video frame is compressed to produce a compressed video frame. Because a finite number of frames are decoded from a stream at any given time, a lossless compression algorithm can be applied to the decoded frames in some implementations. A lossless compression and decompression frame-level procedure can prevent any further image degradation. A compressed video frame occupies less space in memory and consumes less bandwidth on an interconnect, such as a system bus of an SoC. Compressed video frames can therefore be transferred between different chips on a printed circuit board (PCB), between an SoC and a main memory, or even between different components of a single SoC.

To enable the use of per-video-frame, or frame-level, compression in existing systems, each respective component, or core, of an SoC that works with video data includes a respective decompression unit. With this straight-forward conventional approach, each core can independently produce a decompressed video frame from a compressed video frame and then process the compressed video frame in accordance with a given core's video-related purpose. However, this straightforward approach has several attendant costs. First, an appreciable area on the IC die is devoted to duplicative video-frame decompression circuitry or compression circuitry. Second, the display path for presenting videos on a display screen includes a separate decompression unit. Third, the workflow to upgrade video frame compression and decompression technology for an SoC is significantly complicated. This complication results from multiple different cores each including an individual decompression unit or an individual compression unit (including, in some cases, both units). In other words, to upgrade to a newer, more-efficient decompression algorithm, each core that includes a compression unit or a decompression unit has to be simultaneously modified and then reintegrated with the rest of the SoC. This workflow upgrade complication therefore slows the adoption of improved compression/decompression algorithms in multi-core chips.

In contrast, certain implementations that are described herein use a frame compressor-decompressor that is shared. The frame compressor-decompressor can include a frame compressor or a frame decompressor (or both). Multiple cores of an IC chip, such as an SoC, can obtain a decompressed version of a compressed frame from, e.g., the shared frame decompressor. A given core can make a request for a decompressed frame, and the frame decompressor can provide a response that includes the requested decompressed frame. Thus, the frame decompressor can function to provide a frame decompression service, and each core can function as a client to the frame decompression service. Similarly, the frame compressor can function to provide a frame compression service, and each core can function as a client to the frame compression service. These frame-level compression and decompression services can use a lossless algorithm.

In some implementations, an SoC includes multiple different components, such as a video decoder and a display controller, that operate as different cores. The video decoder includes a stream decoder to decode a video stream to produce decoded frames. The video decoder also includes a frame compressor that produces compressed frames from the decoded frames. Multiple different components of the SoC are configured to process decompressed frames. For example, the video decoder may use a decompressed reference frame for further decoding of the video stream. Additionally, the display controller may use a decompressed display frame to present a video on a display screen.

To obtain any of these example types of decompressed frames, a frame decompressor decompresses the corresponding compressed frames. The frame decompressor can route a requested decompressed frame to a requesting core using one or more busses, at least one buffer, or some other routing mechanism. A frame decompressor controller arbitrates shared access to the frame decompressor between at least two cores, such as the video decoder and the display controller. The frame decompressor controller can manage a request queue of compressed frame requests. The management can entail ordering the servicing of the frame requests in accordance with a priority scheme. The frame decompressor controller can also establish a time-shared protocol for access to the frame decompressor. The time-shared protocol can include time slots that are assigned to different cores, the acceptance of interrupts that are issued by cores to seize control of the frame decompressor, and so forth.

In these manners, a frame compressor resource or a frame decompressor resource can be shared between two or more client cores that process video data. By sharing, e.g., a frame decompressor, the area of a SoC devoted to frame decompression is reduced. Additionally, a separate frame decompressor does not need to be inserted along a video display path. Further, the compression/decompression algorithm is decoupled from the overall SoC architecture. Consequently, the compression/decompression algorithm can be updated more easily and thus more frequently because fewer, or even one, frame compressor or frame decompressor is included on the SoC and thus subject to the updating workflow.

Example implementations in various levels of detail are discussed below with reference to the associated figures. The discussion below first describes an example operating environment, then example schemes and hardware, followed by example methods, and ends with an example electronic device and related example aspects.

Example Environment

FIG. 1 illustrates an example environment 100 including a printed circuit board 104 (PCB) in which video frame codec architectures can be implemented. As shown, the environment 100 includes an electronic device 102. The electronic device 102 includes at least one PCB 104. The PCB 104 includes one or more integrated circuits, such as an integrated circuit 106 (IC). As described below with reference to FIGS. 2 and 3, the PCB 104 can include other integrated circuits, such as at least one memory that is discrete from the IC 106. The IC 106 includes at least one frame decompressor 108-2; multiple cores 110-1, 110-2 . . . 110-$n$, with n representing an integer greater than one; and multiple video frames, such as at least one compressed frame 112 and at least one decompressed frame 114. FIG. 1 depicts just the frame decompressor 108-2 for simplicity while describing the example environment 100. However, a frame compressor-decompressor 108 and a frame compressor 108-1 are described below with reference to FIG. 3 and FIG. 3-1, respectively.

In example implementations, the frame decompressor 108-2 is communicatively coupled to at least a portion of the multiple cores 110-1 to 110-$n$. The frame decompressor 108-2 includes circuitry to decompress a compressed video frame. Thus, the frame decompressor 108-2 can decompress the compressed frame 112 to produce the decompressed frame 114. In operation, a core 110 uses the frame decompressor 108-2 to obtain a decompressed version of a compressed frame. For example, the nth core 110-$n$ sends a request 116 to the frame decompressor 108-2 to indicate that a decompressed version of an identified compressed frame 112 is being requested. The frame decompressor 108-2 provides a response 118 that includes the decompressed frame 114. Although video frames are referenced as an example context, the frames described herein can include any frames with visual data, including computer-generated graphic frames, video frames, combination frames, and so forth.

In this manner, the frame decompressor 108-2 provides a decompression service to individual cores of the multiple cores 110-1 to 110-$n$. Similarly, the frame compressor 108-1 (e.g., of FIG. 3-1) can provide a compression service to individual cores of the multiple cores 110-1 to 110-$n$. Thus, the frame decompressor 108-2 or the frame compressor 108-1 (or both) realizes at least part of frame compression-decompression (FCD) server circuitry 122 for the IC 106. Similarly, the multiple cores 110-1 to 110-*n* realize multiple frame compression-decompression (FCD) client circuits 120. Using this client-server architecture, a frame compressor unit or a frame decompressor unit can be shared between two or more cores 110 to save space on the IC 106 and simplify a workflow for upgrading the compression/decompression technology used to compress/decompress video frames for the IC 106. A more detailed example architecture for an IC 106 and a PCB 104 is described below with reference to FIGS. 3, 3-1, and 3-2. However, additional aspects of example implementations are described next with reference to FIG. 2.

Figure 2:
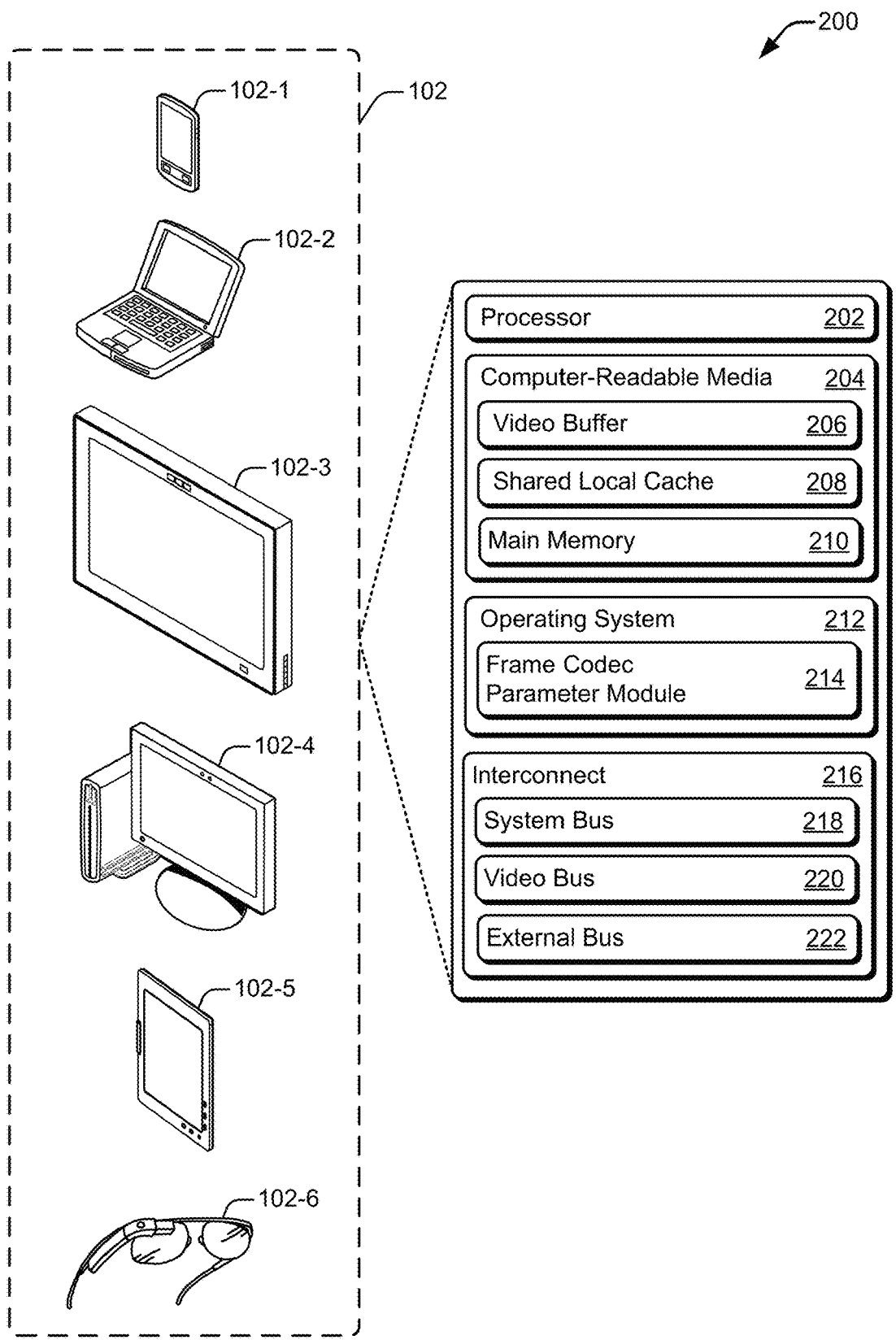
FIG. 2 illustrates other aspects of an example environment in which video frame codec architectures can be implemented.

FIG. 2 illustrates other aspects of an example environment 200 in which video frame codec architectures as described herein can be implemented. The electronic device 102 is illustrated with various non-limiting example devices: a smartphone 102-1, a notebook computer 102-2, a television 102-3, a desktop computer 102-4, a tablet 102-5, and a wearable device 102-6. As shown on the right, the electronic device 102 includes one or more processors 202, one or more computer-readable media 204, and at least one interconnect 216. The computer-readable media 204 can store, hold, or otherwise include code, data, instructions, other information, and so forth. The electronic device 102 can also include an operating system 212. Although depicted separately, the operating system 212 can be stored on one or more computer-readable media 204.

Applications (not shown) or the operating system 212 that is embodied as computer-readable instructions on the computer-readable media 204 can be executed by the processor 202. The operating system 212 or a basic input/output system (BIOS) can include a frame codec parameter module 214. The frame codec parameter module 214 can set one or more parameters to enable, authorize, tune, or otherwise facilitate performance of the shared frame compression and decompression functionalities described herein.

As illustrated, the computer-readable media 204 can include at least one video buffer 206, at least one shared local cache 208, and at least one main memory 210. In some implementations, the video buffer 206 and the shared local cache 208 are separate memory blocks on an IC. In other implementations, the video buffer 206 and the shared local cache 208 are part of a same memory block, such as if part of the shared local cache 208 is used as the video buffer 206 in a dynamically changing or a fixed allocation scheme. The interconnect 216 can include at least one system bus 218, at least one video bus 220, and at least one external bus 222. In some implementations, the video bus 220 and the system bus 218 are different buses. In other implementations, there is no separate video bus, and video data is therefore propagated around an IC using the system bus 218. Example implementations of these computer-readable media 204 and these interconnects 216 are described below with reference to FIGS. 4-6.

Example Components and Techniques

Figure 3:
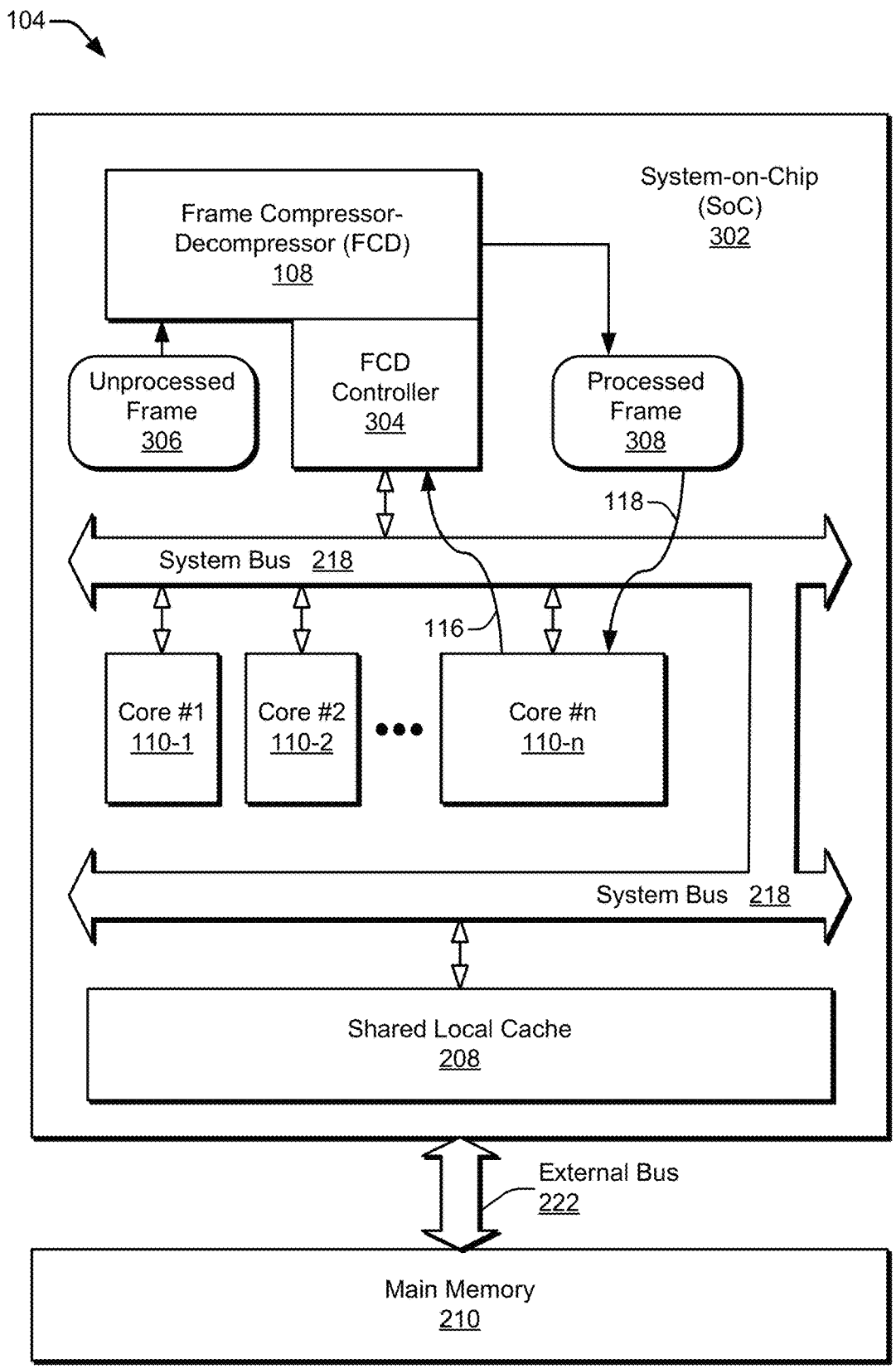
FIG. 3 illustrates a system-on-chip (SoC) having an example implementation of a video frame codec architecture that includes a frame compressor-decompressor, a frame compressor-decompressor controller, and multiple cores.
Figures 1, 3:
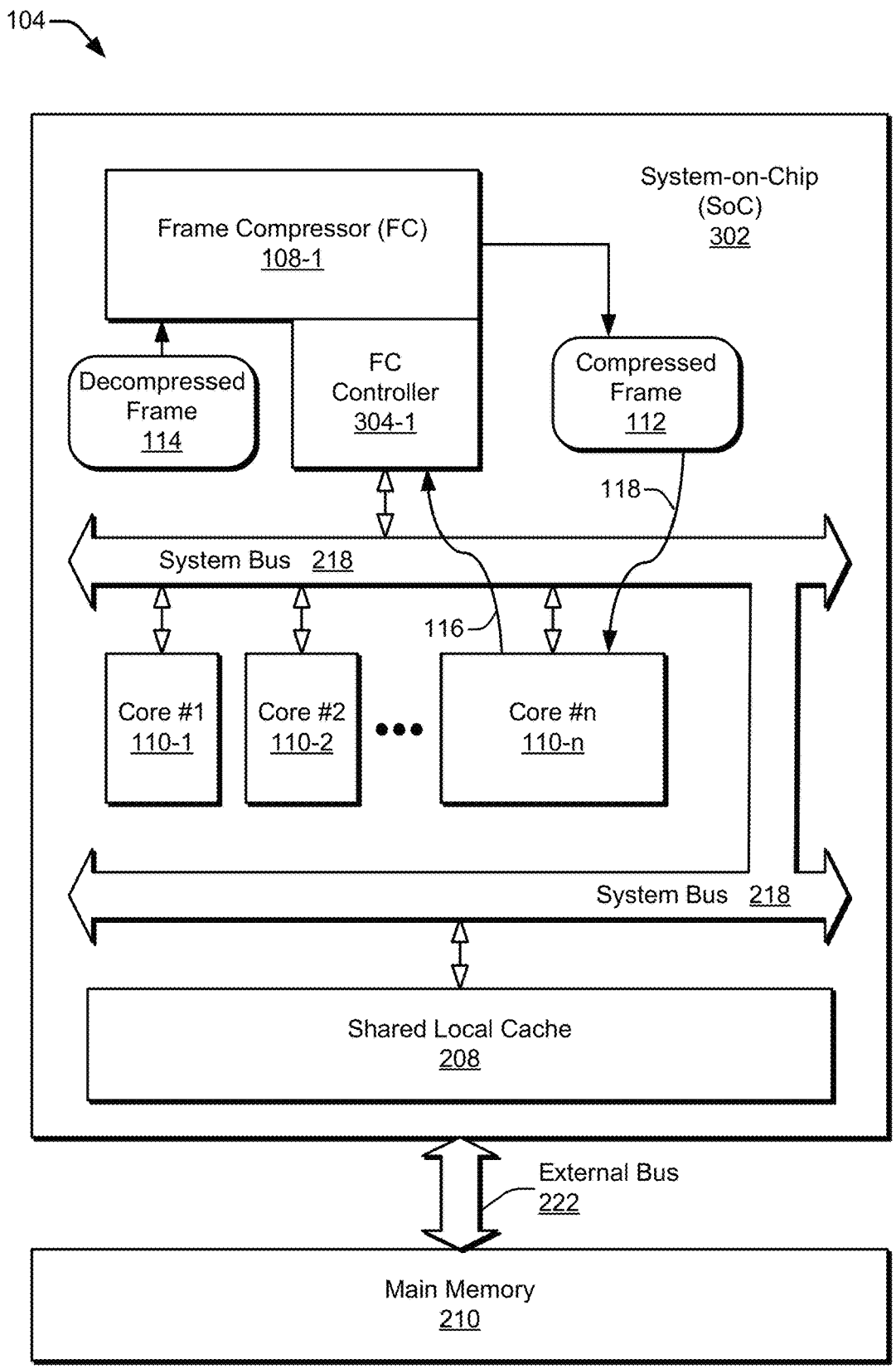
Figures 2, 3:
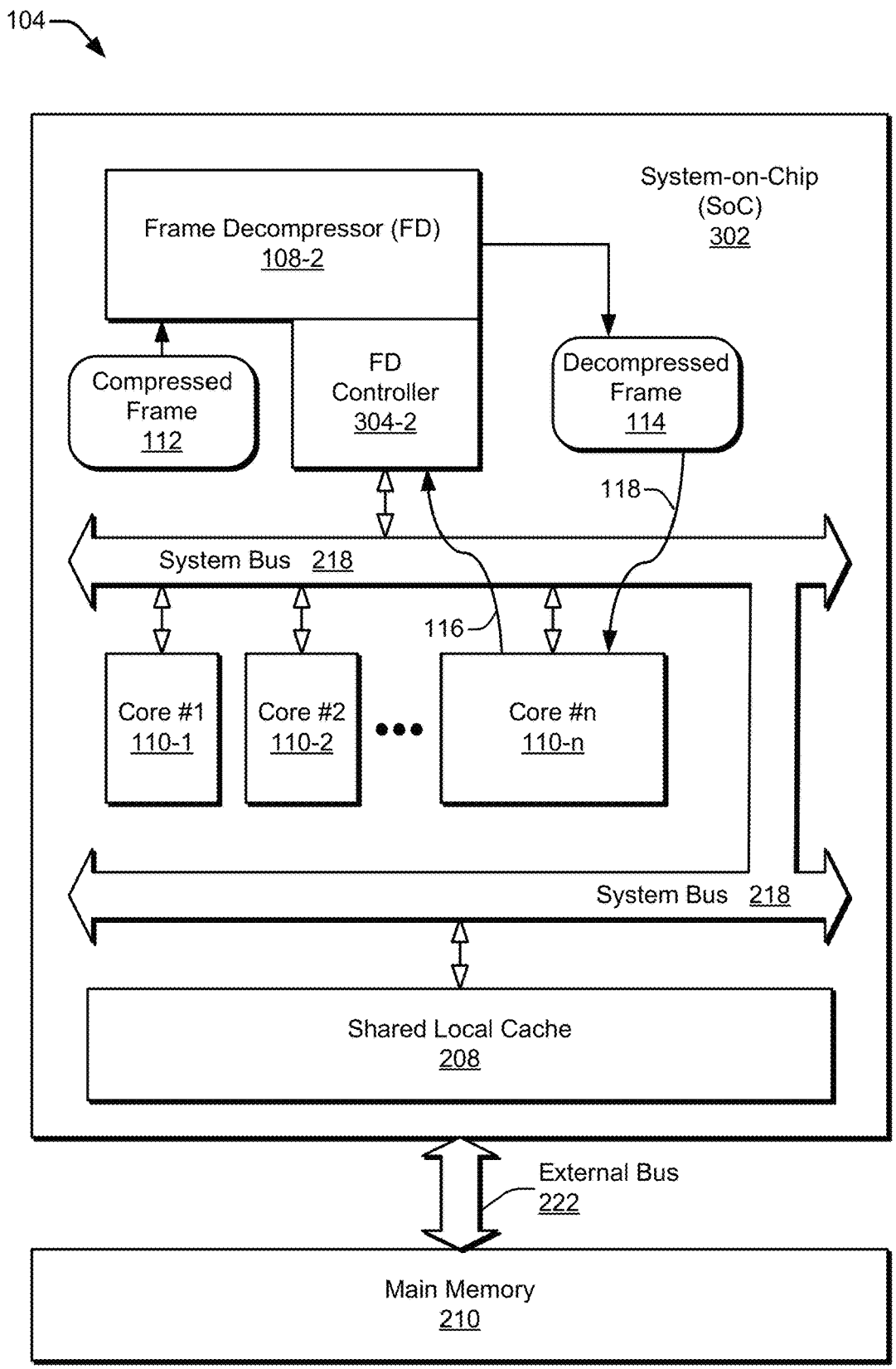

FIG. 3 illustrates a portion of a PCB 104. The PCB 104 includes a system-on-chip 302 (SoC) and a main memory 210. The SoC 302 depicts an example implementation of a video frame codec architecture that includes a frame compressor-decompressor 108 (FCD), a frame compressor-decompressor controller 304, and multiple cores 110-1 to 110-*n*. The SoC 302 also includes a shared local cache 208 and a system bus 218. The main memory 210 is coupled to the SoC 302 via an external bus 222 that is included as part of (e.g., disposed on) the PCB 104.

The PCB 104 can be implemented with a rigid or a flexible material for mounting or securing multiple IC chips, interconnects, interfaces, and so forth. The main memory 210 can be realized using, for example, dynamic random-access memory (DRAM) that is refreshed periodically to maintain memory contents or flash memory that can maintain memory contents without power. Generally, more energy is consumed accessing data stored on the main memory 210 than is consumed accessing data stored on the SoC 302, such as at the shared local cache 208. The shared local cache 208 can be realized using, for example, static random-access memory (SRAM), DRAM, flash memory, or some combination thereof.

The system bus 218 interconnects the multiple cores 110-1 to 110-*n*, the shared local cache 208, the frame compressor-decompressor controller 304, and other components and interfaces (e.g., the frame compressor-decompressor 108 may be directly coupled to the system bus 218). Each core 110 of the multiple cores 110-1 to 110-*n* can store data at or retrieve data from the shared local cache 208 using the system bus 218. Similarly, each core 110 of the multiple cores 110-1 to 110-*n* can store data at or retrieve data from the main memory 210 using the external bus 222, such as by also using the system bus 218 or the shared local cache 208. For example, a first core 110-1 can store data in the shared local cache 208, and a second core 110-2 can then retrieve the stored data from the shared local cache 208.

In an example operation, the frame compressor-decompressor 108 (FCD) processes (e.g., compresses or decompresses) multiple unprocessed frames 306 to produce multiple processed frames 308. The frame compressor-decompressor controller 304 (FCD controller) is coupled to the frame compressor-decompressor 108 and arbitrates access to the frame compressor-decompressor 108 for multiple cores 110-1 to 110-*n*. Although shown separately, the frame compressor-decompressor 108 and the frame compressor-decompressor controller 304 may be logically integrated together. At least two of the cores 110 of the multiple cores 110-1 to 110-*n* are coupled to the frame compressor-decompressor controller 304. Thus, each core 110 can obtain, via the frame compressor-decompressor controller 304, a processed frame 308 that is produced by the frame compressor-decompressor 108 from an unprocessed frame version thereof. The processed frame 308 can be obtained using, for instance, a request 116 and a corresponding response 118.

The frame compressor-decompressor 108 can include a frame compressor 308-1 (e.g., as depicted in FIG. 3-1), a frame decompressor 108-2 (e.g., as depicted in FIG. 3-2), or both. Similarly, the frame compressor-decompressor controller 304 can include a frame compressor controller 304-1 (e.g., as depicted in FIG. 3-1), a frame decompressor controller 304-2 (e.g., as depicted in FIG. 3-2), or both. One of the unprocessed frame 306 or the processed frame 308 corresponds to a compressed frame, and the other corresponds to a decompressed frame, depending on whether the processing operation by the frame compressor-decompressor 108 is a compression or a decompression operation. If a given implementation includes both a frame compressor 108-1 and a frame decompressor 108-2 (or both a frame compressor controller 304-1 and a frame decompressor controller 304-2), such components may be co-located, located proximate to one another, or located at different places on an IC. For instance, each may be located nearer a core that is likely to be the most common client of the corresponding compression or decompression service. Further, if a chip includes a frame compressor 108-1 and a frame decompressor 108-2 that are co-located, each may include fully separate circuitry or they may share circuitry. In some implementations, the frame compressor-decompressor 108 can be realized as a lossless frame data manipulator that adjusts a memory size of the data for the frame as part of a lossless compression operation or a lossless decompression operation, depending on the request 116. Example implementations for compression operations and decompression operations are described below with reference to FIGS. 3-1 and 3-2, respectively.

FIG. 3-1 illustrates an SoC having an example implementation of a video frame codec architecture that includes a frame compressor 108-1 (FC), a frame compressor controller 304-1 (FC controller), and multiple cores. The frame compressor 108-1 compresses uncompressed frames (e.g., decompressed frames 114 or not-yet-compressed frames) to produce compressed frames 112. The frame compressor controller 304-1 is coupled to the frame compressor 108-1 and arbitrates access to the frame compressor 108-1 for the multiple cores 110-1 to 110-*n*. Although shown separately, the frame compressor 108-1 and the frame compressor controller 304-1** may be logically integrated together.

At least two of the cores 110 of the multiple cores 110-1 to 110-*n* are coupled to the frame compressor controller 304-1. Here, each core 110 can include a component or block that produces visual data. Thus, each core 110 can obtain, via the frame compressor controller 304-1, a compressed frame 112 that is produced by the frame compressor 108-1 from a decompressed frame 114 version thereof. Thus, the compressed frame 112 can be obtained using, for instance, a request 116 and a corresponding response 118. In operation, the frame compressor controller 304-1 can grant access to the compression engine of the frame compressor 108-1 to some requesting core 110 on the system bus 218 in a pipelined manner to avoid adding traffic to the external bus 222, which provides access to the main memory 210. In some implementations, the frame compressor controller 304-1 can temporarily grant exclusive access to the requesting core 110** to access the compression resource.

FIG. 3-2 illustrates an SoC having an example implementation of a video frame codec architecture that includes a frame decompressor 108-2 (FD), a frame decompressor controller 304-2 (FD controller), and multiple cores. The frame decompressor controller 304-2 is coupled to the frame decompressor 108-2 and arbitrates access to the frame decompressor 108-2 for the multiple cores 110-1 to 110-*n*. Although shown separately, the frame decompressor 108-2 and the frame decompressor controller 304-2 may be logically integrated together. At least two of the cores 110 of the multiple cores 110-1 to 110-*n* are coupled to the frame decompressor controller 304-2. Thus, each core 110 can obtain, via the frame decompressor controller 304-2, a decompressed frame 114 that is produced by the frame decompressor 108-2 from a compressed frame 112 version thereof. Thus, the decompressed frame 114 can be obtained using, for instance, a request 116 and a corresponding response 118.

Some of the description below focuses on implementations that can perform at least decompression operations. Thus, each may explicitly include a frame decompressor 108-2 and a frame compressor-decompressor controller 304 or a frame decompressor controller 304-2. However, each implementation may additionally or alternatively include a frame compressor 108-2 to perform compression operations. Further, it will be apparent how compression operations and the movement of compressed frames 112 can be achieved in manners that are at least analogous to those described for decompression operations with reference to FIGS. 4-6. Also, the request handling that is described with reference to FIG. 7 and the time-sharing protocol that is described with reference to FIG. 8 can likewise be implemented in similar manners for compression operations.

At least some of the cores 110 can operate on video data for a video-related purpose. Video-related purposes include: video decoding, video displaying, video transcoding (e.g., decoding from one coding format using one algorithm and encoding into another coding format using another algorithm), video compensation (e.g., operation on a video frame by a graphics processing unit (GPU) to improve or augment an image), and so forth. With reference to FIG. 5, example implementations are described below in which the first core is realized as a video decoder and the second core is realized as a display controller. However, an example implementation of the frame decompressor controller 304 is described first with reference to FIG. 4.

Figure 4:
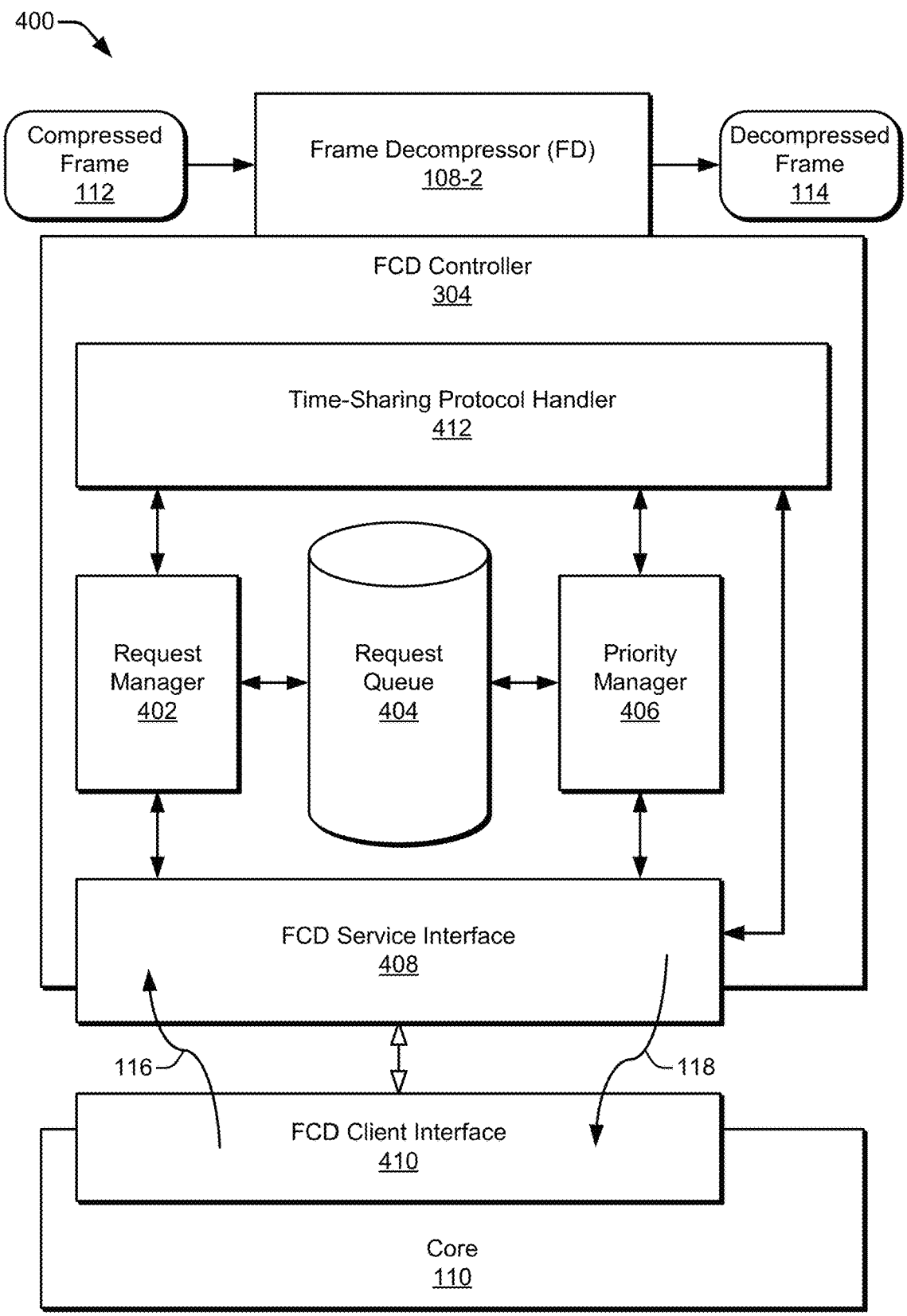
FIG. 4 illustrates an example frame compressor-decompressor controller in conjunction with a frame decompressor and a core.
Figure 5:
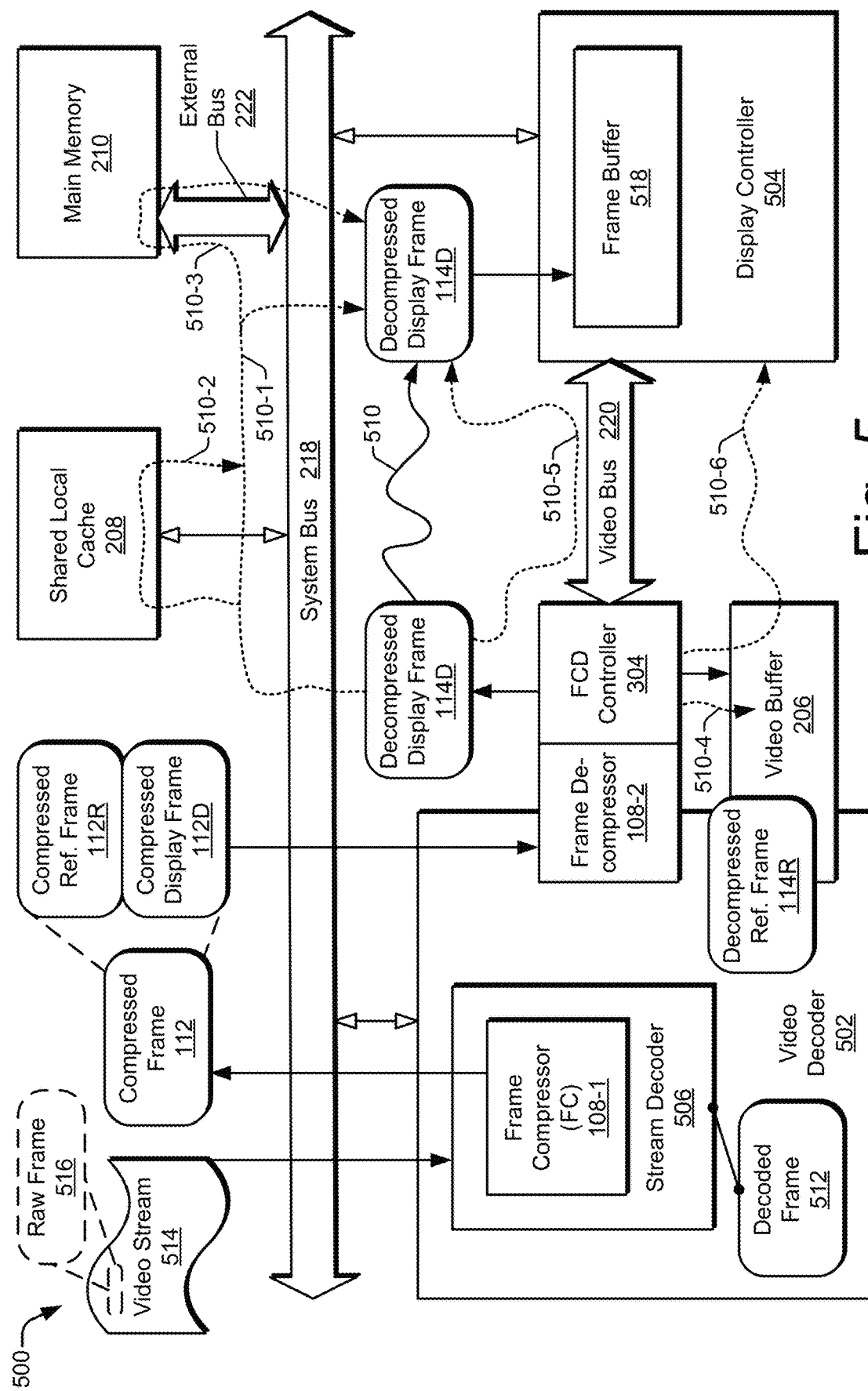
FIG. 5 illustrates an example approach to implement video frame codec architectures in which the multiple cores include a video decoder and a display controller.

FIG. 4 illustrates generally at 400 an example frame compressor-decompressor controller 304 in conjunction with a frame decompressor 108-2 and a core 110. The core 110 includes an FCD client interface 410, and the frame decompressor controller 304 includes an FCD service interface 408. The FCD client interface 410 and the FCD service interface 408 jointly enable communication between the core 110 and the frame compressor-decompressor controller 304. Thus, using these two interfaces, the core 110 can send the request 116 to the frame compressor-decompressor controller 304, and the frame compressor-decompressor controller 304 can send the response 118 to the core 110.

The FCD client interface 410 and the FCD service interface 408 can communicate over a system bus 218 (not shown), a video bus 218, and so forth. The request 116 can be communicated using a bit line, one or more bits of a register, a message formulated into at least one packet, and so forth. The response 118, including a decompressed frame 114, can be communicated using a bus that couples the core 110 to the frame decompressor 108-2, using a memory to which both the core 110 and the frame decompressor 108-2 have access, some combination thereof, and so forth. Examples of different interface communications are described below with reference to FIGS. 5 and 6.

As shown, the frame compressor-decompressor controller 304 includes a request manager 402, a request queue 404, a priority manager 406, and a time-sharing protocol handler 412. The FCD service interface 408 is coupled at least to the request manager 402, the priority manager 406, and the time-sharing protocol handler 412. An example scheme for managing requests, including prioritizing the servicing of the requests, is described below with reference to FIG. 7. An example scheme using the time-sharing protocol handler 412 for establishing a time-sharing protocol to access the frame decompressor 108-2 is described below with reference to FIG. 8.

FIG. 5 illustrates an example approach 500 to implement video frame codec architectures in which the multiple cores of an SoC include a video decoder 502 and a display controller 504. On the left, the video decoder 502 includes a stream decoder 506, which includes a frame compressor 108-1. However, the frame compressor 108-1 may be implemented separately from the stream decoder 506 or the video decoder 502. On the right, the display controller 504 includes a frame buffer 518. The frame decompressor 108-2, the frame compressor-decompressor controller 304 (FCD controller), and the video buffer 206 are associated with the video decoder 502. For example, these three components can be co-located with the video decoder 502 (e.g., disposed next to or physically intermingled with), can be at least partially logically integrated with the video decoder 502, or some combination thereof. Although described with reference to a video decoder 502 and a display controller 504, the principles are applicable to cores 110 generally. Also, although the video buffer 206 is depicted separately from the shared local cache 208, the video buffer 206 may alternatively be incorporated as part of, or allocated from, the shared local cache 208.

In example implementations, an electronic device obtains a video stream 514, which can include a stream of bits that are encoded to represent a video. The video stream 514 is composed of multiple raw frames 516 that are encoded using some codec, such as H.264. The stream decoder 506 receives the video stream 514 via the system bus 218 and decodes the video stream 514 to produce multiple decoded frames 512, one of which is explicitly shown. The frame compressor 108-1 compresses the multiple decoded frames 512 to produce multiple compressed frames 112. As shown, the frame compressor 108-1 is integrated with the stream decoder 506. Thus, the frame compressor 108-1 can compress the decoded frame 512 as part of the decoding process; however, frame compression can be implemented in an alternative manner. These decoded and compressed frames 112 can be stored for subsequent use by the video decoder 502 or another core at the video buffer 206, the shared local cache 208, or the main memory 210.

The decoded and compressed frames 112 may be used for different video-related purposes. For example, a compressed frame 112 may comprise a compressed reference frame 112R if the compressed frame is to be used for further video decoding purposes. Alternatively, another compressed frame 112 may comprise a compressed display frame 112D if the other compressed frame is to be used for video display purposes. For video decoding functionality of the video decoder 502, the frame decompressor 108-2 decompresses the compressed reference frame 112R to produce a decompressed reference frame 114R. The video decoder 502 can continue decoding the video stream 514 using the decompressed reference frame 114R.

For video display functionality of the display controller 504, the frame decompressor 108-2 decompresses the compressed display frame 112D to produce a decompressed display frame 114D. The display controller 504 can request this decompression service from the frame compressor-decompressor controller 304 (e.g., which includes at least a frame decompressor controller 304-2 of FIG. 3-2) via the frame decompressor controller client interface 410 and the frame decompressor controller service interface 408 (both of FIG. 4). The frame compressor-decompressor controller 304 provides the decompressed display frame 114D to the display controller 504 via a routing mechanism 510 (represented by a solid wavy arrow). The display controller 504 can store the decompressed display frame 114D in the frame buffer 518. The display controller 504 can therefore use the stored decompressed display frame 114D to present an image of a video frame on a display screen. Although the frame compressor-decompressor controller 304 of FIG. 5 is described in terms of providing a decompression service with frame decompressor 108-2 to multiple cores, the principles are also applicable to the frame compressor-decompressor controller 304 providing a compression service with frame compressor 108-1 to multiple cores.

Multiple example routing mechanisms 510 are indicated in FIG. 5 using small-dashed lines. The routing mechanisms 510 represent different pathways for the frame compressor-decompressor controller 304 to provide a decompressed frame 114 to a requesting core, such as the video decoder 502 or the display controller 504. In a first routing mechanism 510-1, the frame compressor-decompressor controller 304 provides the decompressed display frame 114D to the frame buffer 518 of the display controller 504 via the system bus 218. In a second routing mechanism 510-2, the frame compressor-decompressor controller 304 provides the decompressed display frame 114D to the display controller 504 via the system bus 218 and the shared local cache 208. For example, the frame compressor-decompressor controller 304 can store the decompressed display frame 114D at the shared local cache 208, and the display controller 504 can retrieve the stored decompressed display frame 114D from the shared local cache 208.

In a third routing mechanism 510-3, the frame compressor-decompressor controller 304 provides the decompressed display frame 114D to the display controller 504 via the system bus 218 and the main memory 210. For example, the frame compressor-decompressor controller 304 can store the decompressed display frame 114D off-chip at the main memory 210 via the system bus 218 and the external bus 222. The display controller 504 can retrieve the stored decompressed display frame 114D from the main memory 210 using the two buses and then store the frame in the frame buffer 518.

A fourth routing mechanism 510-4 pertains to servicing the video decoder 502 as a client of the frame decompression service. In the fourth routing mechanism 510-4, the frame compressor-decompressor controller 304 provides the decompressed reference frame 114R to the video decoder 502. To do so, the frame compressor-decompressor controller 304 transfers the decompressed reference frame 114R to the video buffer 206. The video decoder 502 can access the decompressed reference frame 114R from the video buffer 206.

In a fifth routing mechanism 510-5, if an integrated circuit includes a video bus 220 as well as a system bus 218, the frame compressor-decompressor controller 304 provides the decompressed display frame 114D to the display controller 504 via a video bus 220 that is at least partially separate from the system bus 218. As shown, the video bus 220 is dedicated to propagating video data and extends at least between the frame compressor-decompressor controller 304 and the display controller 504. However, the video bus 220 can be implemented differently, such as by carrying other video data to and from other cores.

In a sixth routing mechanism 510-6, the frame compressor-decompressor controller 304 provides the decompressed display frame 114D to the display controller 504 via the video buffer 206. The frame compressor-decompressor controller 304 stores at least part of the decompressed display frame 114D in the video buffer 206. In one approach, the display controller 504 retrieves the decompressed display frame 114D from the video buffer 206 using at least the system bus 218. In another approach, the display controller 504 retrieves the decompressed display frame 114D from the video buffer 206 using at least the video bus 220 (e.g., if present separately from the system bus 218). With either approach, the sixth routing mechanism 510-6 may further entail a memory-mapped mechanism for the display controller 504 to access the video buffer 206. An example implementation for a memory-mapped mechanism is described next with reference to FIG. 6.

Figure 6:
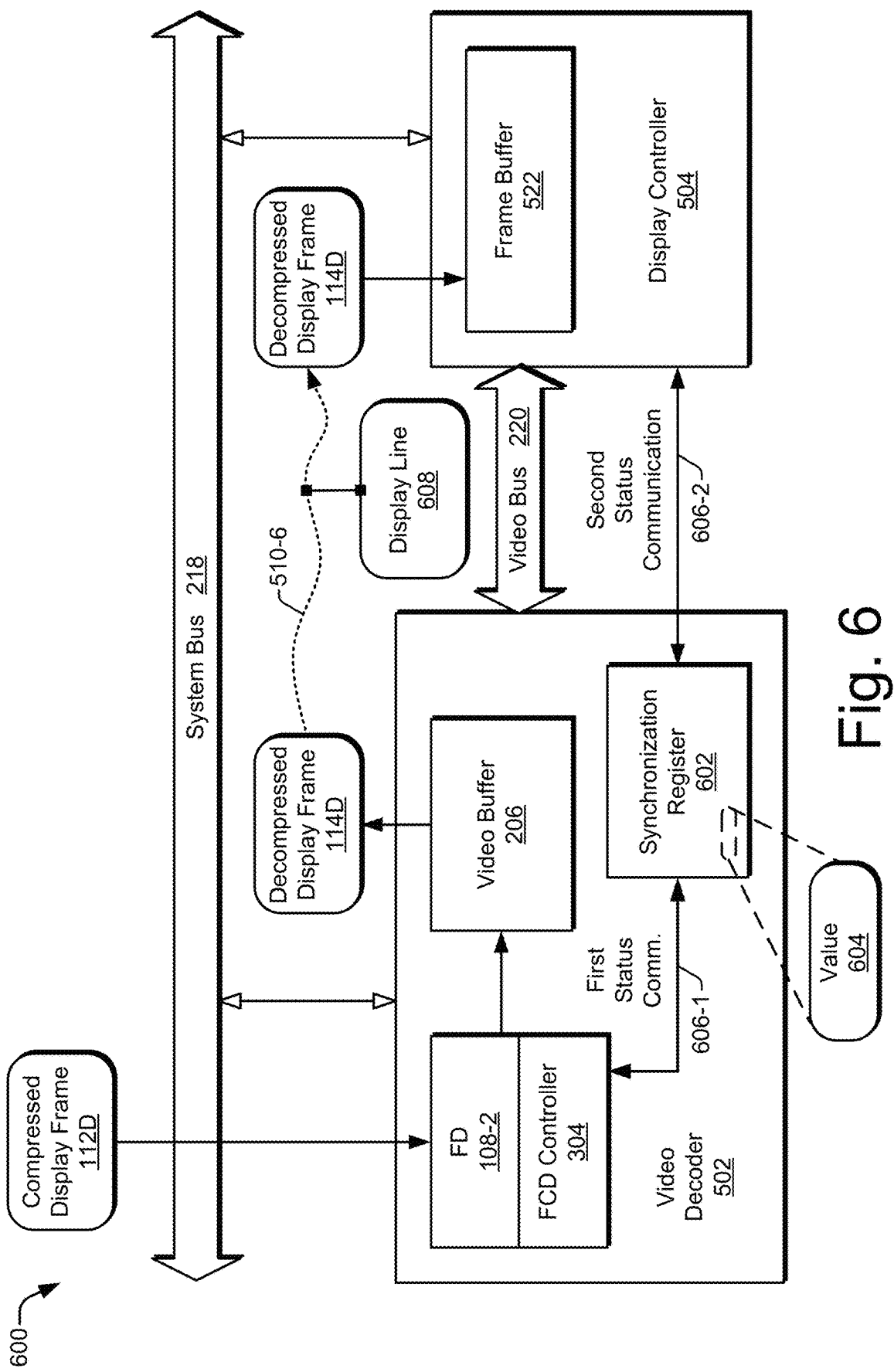
FIG. 6 illustrates an example technique for routing a decompressed display frame from a video decoder to a display controller.

FIG. 6 illustrates an example technique 600 for routing a decompressed display frame 114D from the video decoder 502 to the display controller 504 using the sixth routing mechanism 510-6. In this example, the video decoder 502 is integrated with the frame decompressor 108-2 and the frame compressor-decompressor controller 304. The video decoder 502 includes a synchronization register 602 in addition to the video buffer 206. The video buffer 206 functions as an output buffer in this example. Thus, the frame compressor-decompressor controller 304 causes the frame decompressor 108-2 to store at least a portion of the decompressed display frame 114D in the video buffer 206.

The example technique 600 for the sixth routing mechanism 510-6 involves at least one status communication 606. A first status communication 606-1 occurs between the frame compressor-decompressor controller 304 and the synchronization register 602. A second status communication 606-2 occurs between the display controller 504 and the synchronization register 602. Each status communication 606 can include a polling operation or an updating operation and can be carried out over the system bus 218 or the video bus 220.

Responsive to storing at least a portion of the decompressed display frame 114D in the video buffer 206, the frame compressor-decompressor controller 304 writes a value 604 in the synchronization register 602 as part of an updating operation of a first status communication 606-1. This value 604 is indicative of a stored status of contents of the video buffer 206. Here, the value 604 indicates that particular video data, such as one or more display lines 608 of the decompressed display frame 114D, has been newly placed in the video buffer 206. Thus, the video buffer 206 can function as a line buffer that holds one or more display lines 608.

Meanwhile, the display controller 504 extracts the value 604 from the synchronization register 602 as part of a polling operation of a second status communication 606-2. Based on the value 604, the display controller 504 determines that one or more new display lines 608 of a requested decompressed display frame 114D are present and available in the video buffer 206. The display controller 504 therefore retrieves at least one display line 608 from the video buffer 206 via the system bus 218 or the video bus 220 in accordance with the value 604. Responsive to the retrieval, the display controller 504 writes another value 604 in the synchronization register 602 as part of an updating operation of the second status communication 606-2 to indicate a retrieved status of the corresponding display line 608. This other value 604 is therefore indicative that the at least one corresponding display line 608 has been read out of the video buffer 206.

Periodically, or as part of some operation, the frame compressor-decompressor controller 304 polls the synchronization register 602 as part of the first status communication 606-1. The frame compressor-decompressor controller 304 inspects the other value 604 to determine if the corresponding display line 608 has been accessed and retrieved by the display controller 504. If so, the frame compressor-decompressor controller 304 knows that the memory location of the corresponding display line 608 can be overwritten with new data.

The value 604 or the other value 604 can comprise, for example, one or more bits. The value 604 and the other value 604 may correspond to different storage locations or a same storage location of the synchronization register 602. Although described with reference to a video decoder 502 and a display controller 504, these principles are applicable to cores 110 generally. By polling and updating the values 604 in the synchronization register 602, the routing of the decompressed display frame 114D can be controlled using a memory-mapped transfer mechanism.

Figure 7:
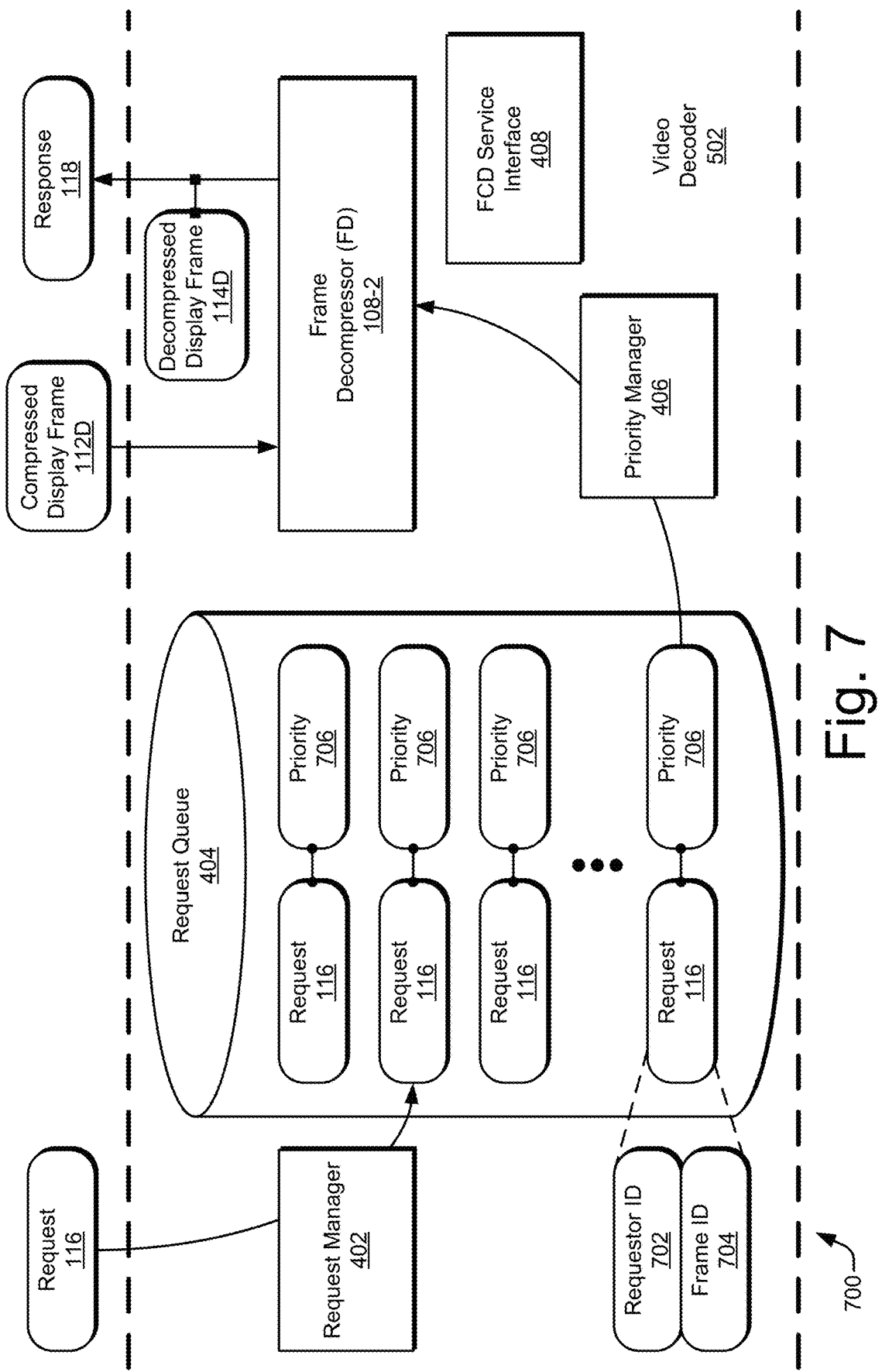
FIG. 7 illustrates an example scheme by a frame decompressor controller to manage requests for decompressed frames issued by multiple cores.

FIG. 7 illustrates an example scheme 700 by a frame compressor-decompressor controller 304 to manage requests 116 that are issued by multiple cores for decompressed frames. In this example, the video decoder 502 is integrated with the frame decompressor 108-2 and the frame compressor-decompressor controller 304. The frame compressor-decompressor controller 304 is represented by the request manager 402, the request queue 404, and the priority manager 406 (which are also shown in FIG. 4). As illustrated, the request queue 404 includes multiple requests 116. Each request 116 corresponds to a priority 706. Each request 116 also includes or corresponds to a requestor identification 702 and a frame identification 704.

Some requests for a decompressed frame may be more important or temporally-pertinent than other requests. For instance, requests relating to a real-time presentation of a streaming video are likely to be more important to an end-user than requests for a video transcoding operation that can be performed in the background at a best-efforts rate. Accordingly, requests for the former video-related purpose can be prioritized over those for the latter video-related purpose. To that end, a priority 706 can be associated with requests, cores, frames, and so forth.

In example implementations, the requestor identification 702 identifies a requesting core 110, such as the video decoder 502 or the display controller 504 (of FIGS. 5 and 6). The frame identification 704 identifies a requested decompressed frame 114, such as by frame number, time index, or an offset thereof. The requestor identification 702 can be realized with an assigned identification value that is transferred along with the request 116, using particular voltage values on one or more bit lines, based on an origin or bus used to provide the request 116 (e.g., if a dedicated bus is respectively provided for each core), and so forth. The frame identification 704 can be explicitly included in each request 116, can be implicitly included in the request 116 (e.g., if a next sequential frame is desired), can be included in a previous request as part of a range of frames, and so forth.

In operation, the request manager 402 receives a request 116 from a core 110, such as via a frame decompressor controller service interface 408. The request manager 402 inserts the request 116 into the request queue 404. In one approach, the request manager 402 operates the request queue 404 in a first-in, first-out (FIFO) manner. Alternatively, the request manager 402 can insert each request 116 into the request queue 404 based on the corresponding priority 706. The corresponding priority 706 of each individual request 116 can be included or can accompany the corresponding individual request 116. Alternatively, the priority 706 can be explicitly assigned in bulk for a group of requests 116, or each core 110 can be associated with a particular priority 706 that is implicitly assigned to each request 116 issued by the associated core 110.

As shown, each request 116 is stored in the request queue 404 in association with the corresponding priority 706 such that requests 116 with different priorities 706 are stored within a same request queue 404. Alternatively, the frame compressor-decompressor controller 304 may implement the illustrated request queue 404 using multiple request queues 404 with each request queue 404 associated with a corresponding priority 706. Each request 116 is therefore stored in a respective request queue 404 associated with the respective priority 706 that corresponds to that request 116.

Regardless of the approach used to implement the illustrated request queue 404, the priority manager 406 orders a servicing of the multiple requests 116 in accordance with the multiple priorities 706 respectively corresponding to the multiple requests 116. Thus, the priority manager 406 extracts a next request 116 using a priority scheme that is based on a relative priority between two or more requests 116. The priority manager 406 forwards the next request 116 to the frame decompressor 108-2. The frame decompressor 108-2 retrieves the compressed frame 112 that corresponds to the requested decompressed frame 114. Continuing the example scenario of FIGS. 5 and 6, the frame decompressor 108-2 retrieves a compressed display frame 112D and performs a decompression operation to produce a decompressed display frame 114D. The frame compressor-decompressor controller interface 408 causes the frame decompressor 108-2 to route the decompressed display frame 114D to the video decoder 502 as part of the response 118.

Figure 8:
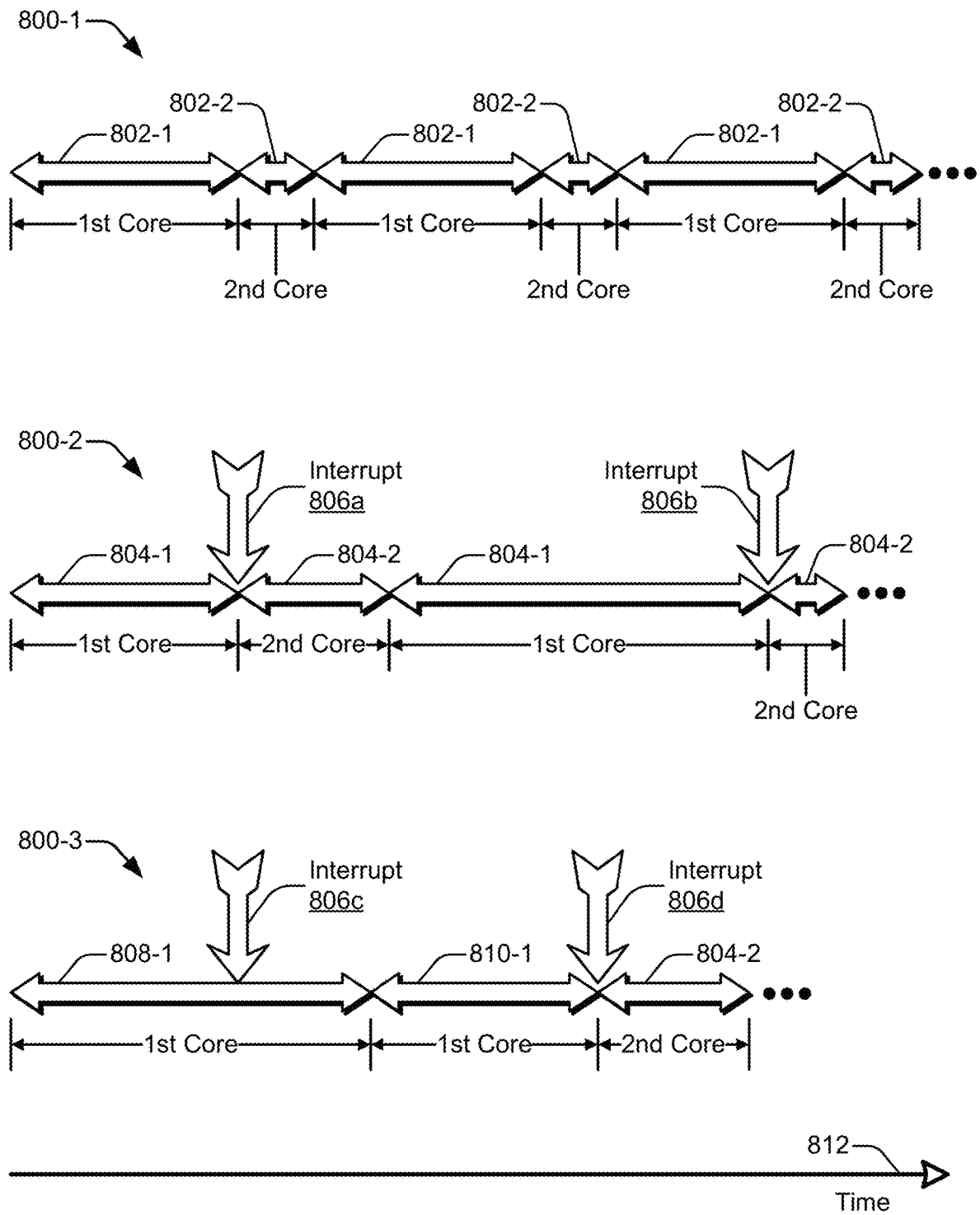
FIG. 8 illustrates an example scheme by a frame compressor-decompressor controller to establish a time-sharing protocol for sharing a frame compression resource or a frame decompression resource.

FIG. 8 illustrates an example scheme by a frame compressor-decompressor controller 304 to establish at least one time-sharing protocol 800 for sharing a frame compression resource, such as a frame compressor 108-1 (e.g., of FIG. 3-1), or a frame decompression resource, such as a frame decompressor 108-2 (e.g., of FIG. 3-2). A time-sharing protocol handler 412 of a frame compressor-decompressor controller 304 (not explicitly shown) can establish at least one example time-sharing protocol 800-1, 800-2, or 800-3. As indicated by an arrow 812, time increases in the rightward direction. Each example time-sharing protocol 800 is described in terms of sharing the frame decompression resource between two cores; however, the disclosed time-sharing protocols 800 can be applied to sharing the frame decompression resource between more than two cores. Although FIG. 8 is described in terms of time sharing a frame decompression, the principles are also applicable to implementing a time-sharing protocol for frame compression.

With a first time-sharing protocol 800-1, time is divided into multiple timeslots. These timeslots have a fixed time, and each respective timeslot is assigned to a respective core. Timeslots 802-1 correspond to a first core, such as a video decoder 502. Timeslots 802-2 correspond to a second core, such as a display controller 504. In operation, the time-sharing protocol handler 412 rotates access to the frame decompression resource between the two cores at the prescribed lengths of the two different timeslots. In the first time-sharing protocol 800-1, interrupts are not enabled.

In contrast, interrupts 806 are enabled with the second time-sharing protocol 800-2. Here, the frame decompression resource is generally reserved for one of the two clients—the first core in this example. Thus, the timeslots 804-1 correspond to the first core and can extend indefinitely. These timeslots 804-1 extend until the time-sharing protocol handler 412 receives an interrupt 806. A core 110 can signal an interrupt 806 via a message on a system bus, using a dedicated video bus, by driving an interrupt line high, and so forth. Responsive to detection of an interrupt 806, the time-sharing protocol handler 412 initiates a context-switch to transfer access to the frame decompression resource to a different core and starts another timeslot.

As shown at the second time-sharing protocol 800-2, the second core issues an interrupt 806a. The time-sharing protocol handler 412 detects the interrupt 806a and transfers access to the frame decompressor 108-2 to the interrupting second core. Thus, the frame decompressor 108-2 performs at least one decompression operation to produce a decompressed frame 114 for the requesting second core during the timeslot 804-2 after the interrupt 806a. A length of each timeslot 804-2 can be fixed, can be dependent on how many requests are queued for the second core, can be dependent on a priority level of each queued request, and so forth. After the first core is granted access to the frame decompression resource again for another timeslot 804-1, the second core can subsequently issue another interrupt 806b. In an alternative approach, each timeslot 804-2 that is assigned to the second core can continue until another core issues an interrupt (not shown). Thus, in this alternative approach, context switching can occur responsive to interrupts 806 and independent of elapsed time.

With a third time-sharing protocol 800-3, time is divided into multiple timeslots. The third time-sharing protocol 800-3 is a hybrid of the first and second time-sharing protocols. Some timeslots, such as the timeslot 808-1, have a fixed time that cannot be interrupted. Other timeslots, such as the timeslot 810-1, have a variable time that can be interrupted by another core. As shown, the first core is assigned to the timeslots 808-1 and 810-1. An interrupt 806c from the second core arrives during the timeslot 808-1. However, the time-sharing protocol handler 412 ignores (or queues) this interrupt 806c. An interrupt 806d that arrives during the timeslot 810-1, on the other hand, triggers a context switch. With the context switch, the frame decompression resource is assigned to the second core for the timeslot 804-2 after the interrupt 806d. If the interrupt 806c is queued (instead of dismissed) during the timeslot 808-1, a context switch can be initiated at the conclusion of the timeslot 808-1 or at the beginning of the timeslot 810-1 responsive to the interrupt 806c.

Having generally described the environment in which techniques and apparatuses for video frame codec architectures can be implemented, this discussion now turns to example methods.

Example Methods

Figure 9:
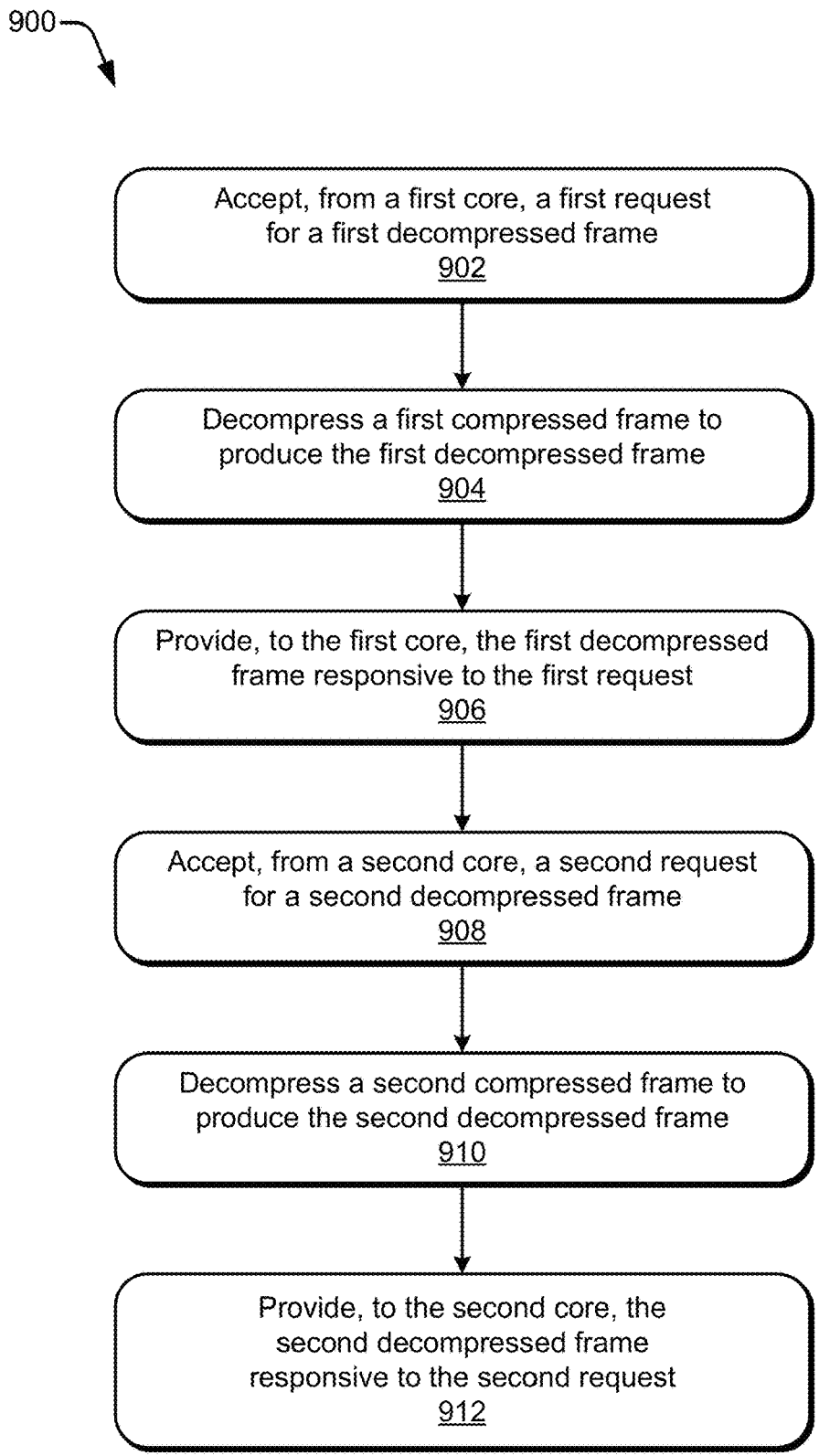
FIG. 9 illustrates example methods for operating video frame codec architectures as described herein.

The following discussion describes methods for operating video frame codec architectures. These methods can be implemented utilizing the previously described examples, such as the electronic device 102 and the PCB 104 as shown in FIGS. 1 and 3, as well as the electronic device 1000 depicted in FIG. 10. Aspects of these methods are illustrated in FIG. 9, which are shown as operations 902-912 that are performed by one or more components of at least one IC chip. The orders in which operations of these methods are shown and/or described are not intended to be construed as a limitation, and any number or combination of the described method operations can be combined in any order to implement a method, or an alternate method. Although the flowchart of FIG. 9 is described in terms of operating a frame decompressor 108-2, the principles can be applied analogously to operating a frame compressor 108-1.

FIG. 9 illustrates an example method 900 for operating video frame codec architectures, which may be implemented by circuitry that offers a frame decompression service to multiple different cores. At 902, a first request for a first decompressed frame is accepted from a first core. For example, a frame compressor-decompressor controller 304 (e.g., a frame decompressor controller 304-2 thereof) can accept from a first core 110-1 a first request 116 for a first decompressed frame 114. The acceptance may be performed via a system bus 218, a video bus 220, a synchronization register 602, and so forth.

At 904, a first compressed frame is decompressed to produce the first decompressed frame. For example, a frame decompressor 108-2 can decompress a first compressed frame 112 to produce the first decompressed frame 114. The servicing of the first request 116 may be performed in accordance with an associated priority 706.

At 906, the first decompressed frame is provided to the first core responsive to the first request. For example, the frame compressor-decompressor controller 304 can provide to the first core 110-1 the first decompressed frame 114 responsive to the first request 116. The first decompressed frame 114 may be transferred from the frame decompressor 108-2 to the first core 110-1 using a routing mechanism 500.

At 908, a second request for a second decompressed frame is accepted from a second core. For example, the frame compressor-decompressor controller 304 can accept from a second core 110-2 a second request 116 for a second decompressed frame 114. The first core 110-1 may comprise a display controller 504, and the second core 110-2 may comprise a video decoder 502.

At 910, a second compressed frame is decompressed to produce the second decompressed frame. For example, the frame decompressor 108-2 can decompress a second compressed frame 112 to produce the second decompressed frame 114. The decompression may be performed using a lossless compression/decompression algorithm. At 912, the second decompressed frame is provided to the second core responsive to the second request. For example, the frame compressor-decompressor controller 304 can provide to the second core 110-2 the second decompressed frame 114 responsive to the second request 116. After obtaining the second decompressed frame 114, the second core 110-2 may process the frame in accordance with a corresponding video-related functionality.

The preceding discussion describes methods relating to video frame codec architectures. Aspects of these methods may be implemented in, for example, hardware (e.g., fixed logic circuitry), firmware, or some combination thereof. These techniques may be realized using one or more of the entities or components shown in FIGS. 1-8 and 10 (an electronic device 1000 is described in FIG. 10 below), which may be further divided, combined, and so on. Thus, these figures illustrate some of the many possible systems or apparatuses capable of employing the described techniques. The entities and components of these figures generally represent firmware, hardware, IC chips, circuits, or a combination thereof.

Example Electronic Device

Figure 10:
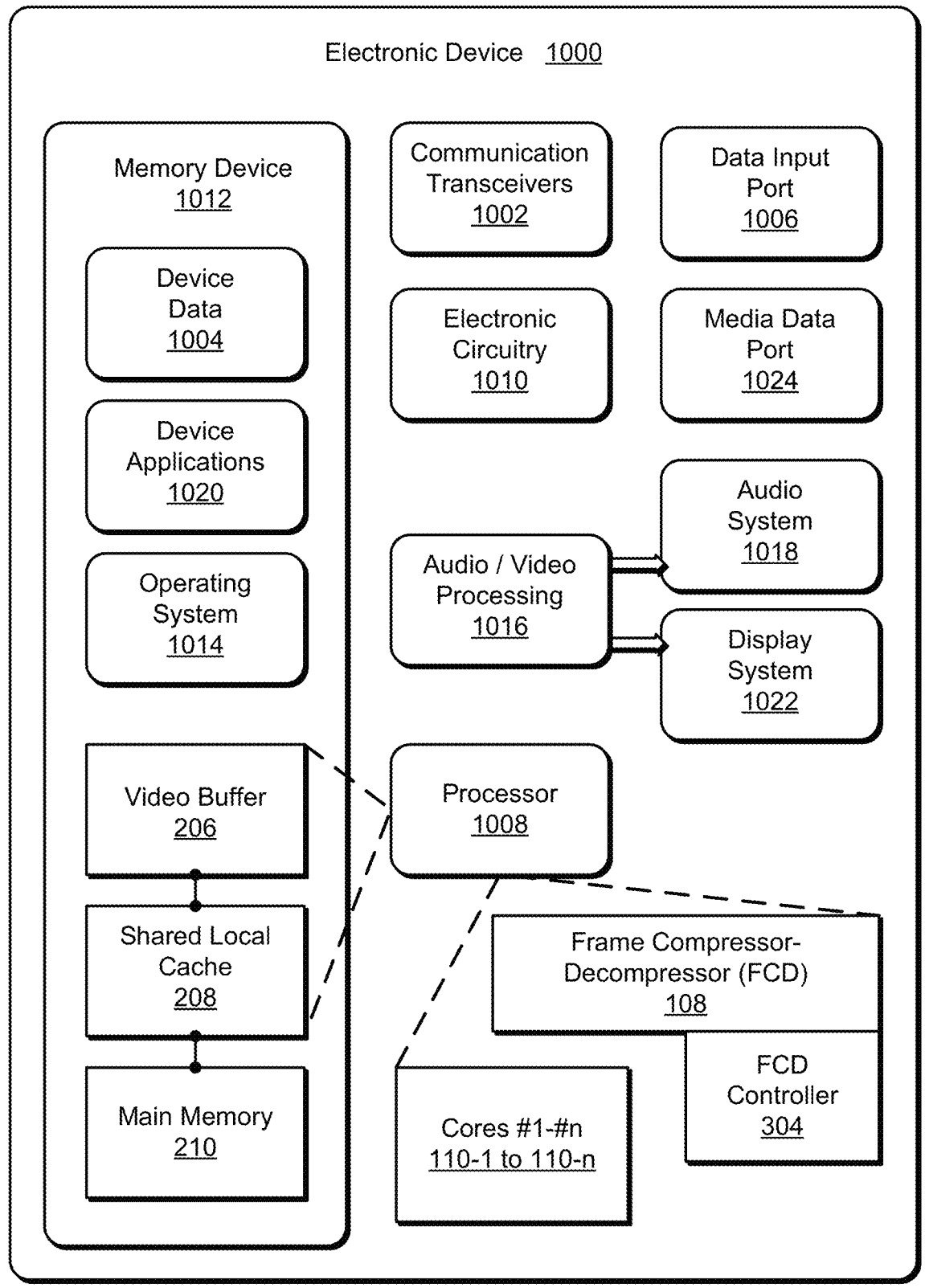
FIG. 10 illustrates various components of an example electronic device that can implement video frame codec architectures in accordance with one or more implementations.

FIG. 10 illustrates various components of an example electronic device 1000 that can implement video frame codec architectures in accordance with one or more implementations as described with reference to any of the previous FIGS. 1-9. The electronic device 1000 may be implemented as any one or combination of a fixed or mobile device, in any form of a consumer, computer, portable, user, server, communication, phone, navigation, gaming, audio, camera, messaging, media playback, and/or other type of electronic device 102, such as the smart phone that is depicted FIG. 1.

Electronic device 1000 includes communication transceivers 1002 that enable wired and/or wireless communication of device data 1004, such as received data, transmitted data, or other information as described above. Example communication transceivers 1002 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

The electronic device 1000 may also include one or more data input ports 1006 via which any type of data, media content, and/or other inputs can be received, such as user-selectable inputs, messages, applications, music, television content, recorded video content, and any other type of audio, video, and/or image data received from any content and/or data source. The data input ports 1006 may include USB ports, coaxial cable ports, and other serial or parallel connectors (including internal connectors) for flash memory, DVDs, CDs, and the like. These data input ports 1006 may be used to couple the electronic device to components, peripherals, or accessories such as keyboards, microphones, or cameras.

The electronic device 1000 of this example includes at least one processor 1008 (e.g., any one or more of application processors, microprocessors, digital-signal processors (DSPs), controllers, and the like), which can include a combined processor and memory system (e.g., implemented as part of an SoC), that processes (e.g., executes) computer-executable instructions stored on computer-readable media to control operation of the device. The processor 1008 may be implemented as an application processor, embedded controller, microcontroller, SoC, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other hardware.

Alternatively or additionally, the electronic device 1000 can be implemented with any one or combination of electronic circuitry, which may include software, hardware, firmware, or fixed logic circuitry that is implemented in connection with processing and control circuits, which are generally indicated at 1010 (as electronic circuitry 1010). This electronic circuitry 1010 can implement executable or hardware-based modules (not shown) through logic circuitry and/or hardware (e.g., such as an FPGA), and so forth.

Although not shown, the electronic device 1000 can include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The electronic device 1000 also includes one or more memory devices 1012 that enable data storage, examples of which include random access memory (RAM), non-volatile memory (e.g., read-only memory (ROM), flash memory, EPROM, and EEPROM), and a disk storage device. The memory device(s) 1012 provide data storage mechanisms to store the device data 1004, other types of code and/or data, and various device applications 1020 (e.g., software applications or programs). For example, an operating system 1014 can be maintained as software instructions within the memory device 1012 and executed by the processor 1008.

As shown, the electronic device 1000 also includes an audio and/or video processing system 1016 that processes audio data and/or passes through the audio and video data to an audio system 1018 and/or to a display system 1022 (e.g., a video buffer or a screen of a smart phone or camera). The audio system 1018 and/or the display system 1022 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1024. In some implementations, the audio system 1018 and/or the display system 1022 are external or separate components of the electronic device 1000. Alternatively, the display system 1022 can be an integrated component of the example electronic device 1000, such as part of an integrated touch interface.

The electronic device 1000 of FIG. 10 is an example implementation of the electronic device 102 of FIG. 1. Thus, the processor 1008 is an example of the integrated circuit 106, the processor 202, or the SoC 302 (e.g., of FIGS. 1, 2, and 3, respectively). Thus, as indicated in FIG. 10, the processor 1008 may include a frame compressor-decompressor 108, multiple cores 110-1 to 110-$n$, and a frame compressor-decompressor controller 304. In FIG. 10, the video buffer 206, the shared local cache 208, and the main memory 210 (e.g., each also of FIG. 2, 3, 5, or 6) are depicted as forming at least a portion of a memory system, such as by being part of one or more memory devices 1012. As described above, one or more of these memory components may be part of same integrated circuit as that of the processor 1008 (e.g., the video buffer 206 and the shared local cache 208 being a part of the SoC 302 in FIG. 3) or instead located on a separate die, or even disposed on a different printed circuit board. Thus, the principles of video frame codec architectures as described herein can be implemented by, or in conjunction with, the electronic device 1000 of FIG. 10.

Although implementations for video frame codec architectures have been described in language specific to certain features and/or methods, the subject of the appended claims is not necessarily limited to the specific features or methods described. Rather, the specific features and methods are disclosed as example implementations for video frame codec architectures.

What is claimed is:

1. An electronic device comprising:
    a video decoder configured to decode a video stream to produce multiple decoded frames, the video decoder including:
        a frame decompressor configured to decompress multiple compressed frames to produce multiple decompressed frames, the multiple compressed frames produced from the multiple decoded frames; and
        a frame decompressor controller coupled to the frame decompressor and configured to arbitrate access to the frame decompressor; and
    a display controller coupled to the frame decompressor controller, the display controller configured to obtain via the frame decompressor controller a decompressed frame of the multiple decompressed frames produced by the frame decompressor.

2. The electronic device of claim 1, wherein:
    the multiple compressed frames include a compressed reference frame;
    the frame decompressor is configured to decompress the compressed reference frame to produce a decompressed reference frame; and
    the video decoder is configured to decode part of the video stream using the decompressed reference frame.

3. The electronic device of claim 2, wherein:
    the multiple compressed frames include a compressed display frame;
    the decompressed frame obtained by the display controller comprises a decompressed display frame;
    the frame decompressor is configured to decompress the compressed display frame to produce the decompressed display frame; and
    the display controller is configured to control a presentation on a display screen using the decompressed display frame.

4. The electronic device of claim 1, wherein the video decoder further includes:
    a frame compressor configured to compress the multiple decoded frames to produce the multiple compressed frames.

5. The electronic device of claim 4, wherein the video decoder further includes:
    a frame compressor controller coupled to the frame compressor and configured to arbitrate access to the frame compressor between at least the video decoder and the display controller.

6. The electronic device of claim 1, wherein the video decoder further includes:
    a video buffer associated with the frame decompressor; and
    a synchronization register corresponding to the video buffer, the synchronization register configured to store one or more values indicative of a status of contents of the video buffer.

7. The electronic device of claim 6, wherein:
    the frame decompressor is configured to store at least a portion of the decompressed frame in the video buffer; and
    the frame decompressor controller is configured to write into the synchronization register at least one value indicative of a stored status of the portion of the decompressed frame.

8. The electronic device of claim 7, wherein:
    the display controller is configured to retrieve the portion of the decompressed frame from the video buffer responsive to the at least one value indicative of the stored status of the portion of the decompressed frame; and
    the display controller is configured to write into the synchronization register at least another value indicative of a retrieved status of the portion of the decompressed frame.

9. The electronic device of claim 1, wherein the frame decompressor controller is configured to establish a time-sharing protocol to share the frame decompressor between at least the video decoder and the display controller.

10. The electronic device of claim 9, wherein the frame decompressor controller is configured to at least one of:
    establish the time-sharing protocol to include multiple timeslots that are assigned to at least one of the video decoder or the display controller; or
    establish the time-sharing protocol to permit reception of an interrupt signal from at least one of the video decoder or the display controller, the interrupt signal indicative of a request for another decompressed frame.

11. The electronic device of claim 1, wherein:
    the frame decompressor controller comprises a request queue configured to store multiple requests, each request associated with at least one of the video decoder or the display controller, each request corresponding to at least one decompressed frame; and
    the frame decompressor controller is configured to order servicing of the multiple requests in accordance with multiple priorities corresponding to the multiple requests.

12. The electronic device of claim 1, further comprising:
a video transcoder configured to obtain, via the frame decompressor controller, another decompressed frame of the multiple decompressed frames produced by the frame decompressor, the video transcoder configured to decode video data from one coding format using one algorithm and encode the video data into another coding format using another algorithm.

13. The electronic device of claim 1, further comprising:
a video compensator configured to obtain, via the frame decompressor controller, another decompressed frame of the multiple decompressed frames produced by the frame decompressor, the video compensator configured to operate on video data to improve or augment an image thereof.

14. The electronic device of claim 1, wherein the frame decompressor is configured to decompress at a frame-level each respective compressed frame of the multiple compressed frames to produce a respective decompressed frame of the multiple decompressed frames.

15. The electronic device of claim 14, wherein the frame decompressor is configured to decompress, at the frame-level, each respective compressed frame to produce the respective decompressed frame using a lossless frame-level decompression algorithm.

16. The electronic device of claim 1, further comprising:
a system-on-chip (SoC), the SoC including:
a first core comprising the video decoder; and
a second core comprising the display controller.

17. An electronic device comprising:
a video decoder configured to decode a video stream to produce multiple decoded frames, the video decoder including:
frame decompression means for decompressing multiple compressed frames to produce multiple decompressed frames, the multiple compressed frames produced from the multiple decoded frames; and
decompression control means for arbitrating access to the frame decompression means; and
a display controller configured to present images on a display screen, the display controller including means for obtaining, from the frame decompression means, a decompressed frame of the multiple decompressed frames using the decompression control means.

18. The electronic device of claim 17, wherein the video decoder further includes:
frame compression means for compressing the multiple decoded frames to produce the multiple compressed frames; and
compression control means for arbitrating access to the frame compression means between at least the video decoder and the display controller.

19. An electronic device comprising:
a video decoder including:
a stream decoder configured to decode a video stream to produce multiple decoded frames;
a frame compressor configured to compress the multiple decoded frames to produce multiple compressed frames;
a frame decompressor configured to decompress the multiple compressed frames to produce multiple decompressed frames; and
a frame decompressor controller coupled to the frame decompressor and configured to arbitrate access to the frame decompressor; and
a display controller coupled to the frame decompressor controller, the display controller configured to obtain via the frame decompressor controller a decompressed frame of the multiple decompressed frames produced by the frame decompressor.

20. The electronic device of claim 19, further comprising:
a system-on-chip (SoC), the SoC including:
the video decoder;
the display controller; and
a video bus coupling the video decoder to the display controller,
wherein the display controller is configured to obtain the decompressed frame over the video bus.

* * * * *